US012579866B2

(12) United States Patent
Peterson et al.

(10) Patent No.: US 12,579,866 B2
(45) Date of Patent: *Mar. 17, 2026

(54) SLOT MACHINE IMPLEMENTING A MIRROR OPERATION

(71) Applicant: IGT, Las Vegas, NV (US)

(72) Inventors: Chris Peterson, Reno, NV (US); Nick Hillstrom, Reno, NV (US); Nathan Ajhar, Sparks, NV (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/085,744

(22) Filed: Dec. 21, 2022

(65) Prior Publication Data

US 2023/0117337 A1 Apr. 20, 2023

Related U.S. Application Data

(63) Continuation of application No. 17/370,315, filed on Jul. 8, 2021, now Pat. No. 11,688,244, which is a continuation of application No. 16/241,109, filed on Jan. 7, 2019, now Pat. No. 11,074,786.

(51) Int. Cl.
*G07F 17/32* (2006.01)
*G06Q 50/34* (2012.01)

(52) U.S. Cl.
CPC ...... *G07F 17/3267* (2013.01); *G07F 17/3213* (2013.01); *G07F 17/3244* (2013.01); *G06Q 50/34* (2013.01)

(58) Field of Classification Search
CPC ............ G07F 17/3213; G07F 17/3244; G07F 17/3267; G07F 17/34; G07F 17/326; G07F 17/3211; G07F 17/3265; G07F 17/3258; G06Q 50/34
See application file for complete search history.

(56) References Cited

U.S. PATENT DOCUMENTS

| | | | | |
|---|---|---|---|---|
| 6,186,894 | B1 * | 2/2001 | Mayeroff | G07F 17/34 463/16 |
| 11,074,786 | B2 | 7/2021 | Peterson et al. | |
| 11,605,267 | B2 | 3/2023 | Peterson et al. | |
| 2003/0017868 | A1 | 1/2003 | Crawford | |
| 2004/0048646 | A1 | 3/2004 | Visocnik | |
| 2007/0026923 | A1 | 2/2007 | Muir | |
| 2009/0233686 | A1 | 9/2009 | Nguyen | |
| 2010/0120507 | A1 | 5/2010 | Rodgers et al. | |
| 2014/0274296 | A1 | 9/2014 | Troy | |
| 2021/0335100 | A1 | 10/2021 | Peterson et al. | |

OTHER PUBLICATIONS

"Random number generation," Wikipedia, Dec. 19, 2018, 11 pages [retrieved online from: en.wikipedia.org/w/ndex.php?title=Random_number_generation&oldid=874509981].

(Continued)

*Primary Examiner* — Justin L Myhr
(74) *Attorney, Agent, or Firm* — Sheridan Ross P.C.

(57) ABSTRACT

The present disclosure relates generally to computational devices and, in particular, toward a computational device, system, and method of operating a computational device. The method may include determining that a mirror symbol has landed within a predetermined symbol area and then implementing a bonus spin and mirror operation in response thereto.

20 Claims, 22 Drawing Sheets

(56) References Cited

OTHER PUBLICATIONS

Official Action for U.S. Appl. No. 16/241,109, dated Mar. 13, 2020 12 pages.
Official Action for U.S. Appl. No. 16/241,109, dated Aug. 24, 2020 14 pages.
Notice of Allowance for U.S. Appl. No. 16/241,109, dated Mar. 10, 2021 8 pages.
Official Action for U.S. Appl. No. 17/370,315, dated May 27, 2022 7 pages.
Notice of Allowance for U.S. Appl. No. 17/370,315, dated Sep. 21, 2022 8 pages.
Official Action for U.S. Appl. No. 17/341,222, dated May 2, 2022 7 pages.
Official Action for U.S. Appl. No. 17/341,222, dated Aug. 17, 2022 9 pages.
Notice of Allowance for U.S. Appl. No. 17/341,222, dated Nov. 7, 2022 8 pages.
Notice of Allowance for U.S. Appl. No. 17/370,315, dated Feb. 23, 2023 8 pages.

* cited by examiner

SLOT MACHINE IMPLEMENTING A MIRROR OPERATION

CROSS REFERENCE TO RELATED APPLICATIONS

The present application is a continuation of U.S. patent application Ser. No. 17/370,315, filed Jul. 8, 2021, now U.S. Pat. No. 11,688,244, issued Jun. 27, 2023, which is a continuation of U.S. patent application Ser. No. 16/241,109, filed Jan. 7, 2019, now U.S. Pat. No. 11,074,786, issued Jul. 27, 2021, the entire disclosures of which are hereby incorporated by reference.

BACKGROUND

The present disclosure is directed toward a slot machine and, in particular, a slot machine that implements a mirror operation.

Gaming machines are constantly trying to provide improved game play features to improve the player experience. Any type of game play feature that presents the player with an additional opportunity to win is often viewed as desirable.

BRIEF SUMMARY

In certain embodiments, the present disclosure relates to a method of operating a computational device, including: initiating, with a processor, a first reel spin in which a random number generator is used to determine a position of symbols within an array of symbol areas; after the first reel spin, evaluating, with the processor, the position of symbols within the array of symbol areas to determine whether the first reel spin results in a predetermined outcome warranting an update to a credit meter; after the first reel spin, further evaluating, with the processor, the position of symbols within the array of symbol areas to determine whether a predetermined mirror symbol has landed within a predetermined symbol area; determining, with the processor, that the predetermined mirror symbol has landed within the predetermined symbol area; identifying, with the processor, a set of symbols within the array of symbol areas to reposition within the array of symbol areas according to a mirror operation; performing, with the processor, the mirror operation such that the set of symbols within the array of symbol areas are repositioned relative to the predetermined symbol area having the predetermined mirror symbol; and after the mirror operation, evaluating, with the processor, a reposition of the symbols within the array of symbol areas to determine whether the mirror operation results in a second predetermined outcome warranting a second update to the credit meter.

In some embodiments, the present disclosure also relates to a computational device including a user interface including a user input and user output; a processor coupled with the user interface; and a computer-readable storage medium, coupled with the processor, including instructions that are executable by the processor, where the instructions include: instructions that initiate a reel spin in which a random number generator is used to determine a position of symbols within an array of symbol areas; instructions that present the array of symbol areas with the symbols positioned according to the reel spin; instructions that, after the reel spin, evaluate the position of symbols within the array of symbol areas to determine whether a predetermined mirror symbol has landed within a predetermined symbol area; instructions that determine that the predetermined mirror symbol has landed within the predetermined symbol area; instructions that identify a set of symbols within the array of symbol areas to reposition within the array of symbol areas according to a mirror operation; instructions that perform the mirror operation such that the set of symbols within the array of symbol areas are repositioned relative to the predetermined symbol area having the predetermined mirror symbol; instructions that present the array of symbol areas with the symbols repositioned according to the mirror operation; and instructions that, after the mirror operation, evaluate the repositioned symbols within the array of symbol areas to determine whether the mirror operation results in a predetermined outcome justifying a game play event.

In some embodiments, the present disclosure also relates to a system that includes: a processor; a computer-readable storage medium, coupled with the processor, including instructions that are executable by the processor, where the instructions include: instructions that initiate a reel spin in which a random number generator is used to determine a position of symbols within an array of symbol areas; instructions that present the array of symbol areas with the symbols positioned according to the reel spin; instructions that, after the reel spin, evaluate the position of symbols within the array of symbol areas to determine whether the reel spin results in an outcome warranting an update to a credit meter; instructions that update the credit meter based on the outcome; instructions that, after the reel spin and after the update to the credit meter, further evaluate the position of symbols within the array of symbol areas to determine whether a predetermined mirror symbol has landed within a predetermined symbol area; instructions that determine that the predetermined mirror symbol has landed within the predetermined symbol area; instructions that identify a set of symbols within the array of symbol areas to reposition within the array of symbol areas according to a mirror operation; instructions that perform the mirror operation such that the set of symbols within the array of symbol areas are repositioned relative to the predetermined symbol area having the predetermined mirror symbol; instructions that present the array of symbol areas with the symbols repositioned according to the mirror operation; and instructions that, after the mirror operation, evaluate the repositioned symbols within the array of symbol areas to determine whether the mirror operation results in a predetermined outcome justifying a game play event.

Additional features and advantages are described herein and will be apparent from the following Description and the figures.

DETAILED DESCRIPTION

Figure 1A:
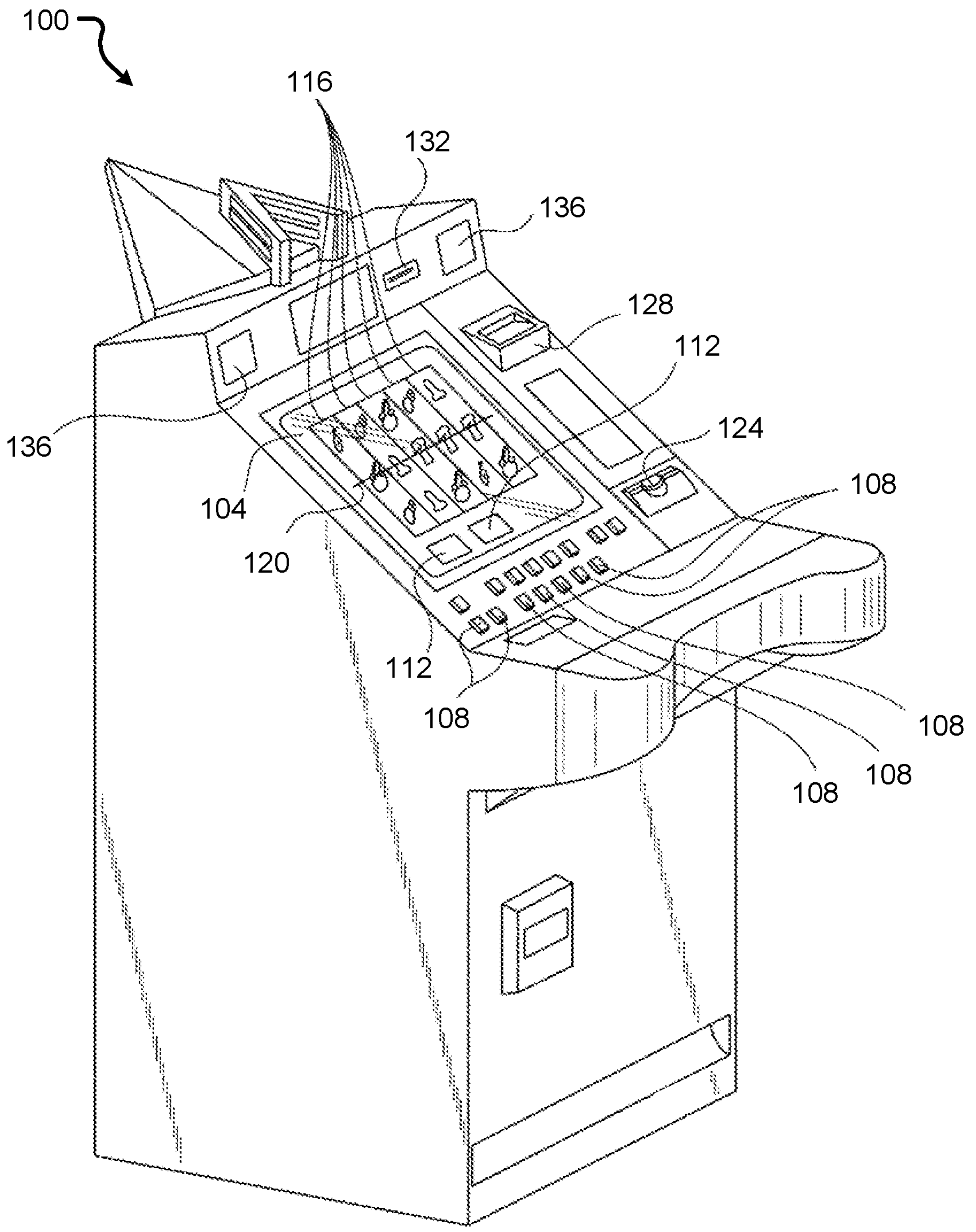
FIG. 1A depicts one example of a computational device in accordance with embodiments of the present disclosure.

Embodiments of the present disclosure will be described in connection with a computational device and, in particular, a computational device, such as a slot machine or Electronic Gaming Machine (EGM), that implements a mirror operation. While embodiments of the present disclosure will be described in connection with the example of a slot machine or EGM implementing a mirror operation, it should be appreciated that embodiments of the present disclosure are not so limited. For instance, other types of computational devices, such as portable user devices, smartphones, tablets, laptops, Personal Computers (PCs), wearable devices, etc. may be used to implement a mirror operation as part of a game as described herein. Furthermore, it should be appreciated that embodiments of the present disclosure may apply to games other than slot games. For instance, embodiments of the present disclosure may be used in connection with any type of game such as bingo, keno, slots, video poker, table games, etc.

In some embodiments, a game feature is disclosed in which symbols are switched from one reel to another reel, from one column to another column, from one row to another row, etc., for further evaluation of a winning symbol combination.

In some embodiments, a mirror operation is provided as a feature where a particular reel of a slot machine (e.g., a center reel (such as reel 3 in a 4×5 layout)) can mirror symbols from one side of the feature trigger to the other. It could also be used in a way so that the mirror does not always involve flipping symbols from reels 1 and 2 to 4 and 5, respectively, but in a way where the mirror operation is performed diagonally, vertically, or horizontally. In some embodiments, a win evaluated after a mirror operation could be an additive win, as in the reels first get evaluated for any wins with current symbols, then the mirror operation could trigger after the first evaluation so that any of the new symbols landing on a pay line could contribute to a current win.

In one non-limiting example, the trigger to mirror a symbol combination may correspond to a random trigger and may result in a second symbol combination evaluation after the first evaluation. In another example, the trigger to mirror a symbol combination may only occur if the player wins on the first symbol combination. In another example, the trigger to mirror a symbol combination may occur at predetermined intervals or in response to events (internal or external), which may be definable by the system operator. The types of events that may trigger the mirror operation include, for example, winning events, bonus events, "free spin" events, major combinations on a pay line, minor combinations on a pay line, wild symbols landing on a pay line, etc.

In some non-limiting examples, the mirror operation may be reserved for bonus play. In other examples, the mirror operation may only be used for initial game play and may be prohibited from bonus play. In a very specific, but non-limiting example, a special symbol combination may take the player into a bonus play in which the player has the opportunity to decide whether or not to invoke the mirror operation.

The determination to enable the mirror operation may generally be made after a reel spin, but there are situations where it may be desirable to enable or pre-select the mirror operation before a spin (e.g., with a predetermination of the game outcome to at least include enablement of the mirror operation). In some examples, the mirror operation may correspond to an additional wager type that the player is allowed to make (e.g., the same way a player can decide whether to bet one pay line, two pay lines, or more, the player may also decide to bet the original spin, the mirror operation after the original spin, or both).

In some embodiments, a method may include receiving a player's input to start a first spin, determining whether or not to award a first win based on the first spin, determining whether or not to enable a mirror operation based on the first spin, mirroring the symbols in a predetermined fashion, determining whether or not a second win has occurred based on the mirror operation, and then determining a second win amount if the player has won during the mirror operation.

As mentioned above, this mirror operation may be made available within the context of a slot game, a poker machine, or in any other game of chance that awards particular symbol combinations relative to positions on a user interface.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Figure 1B:
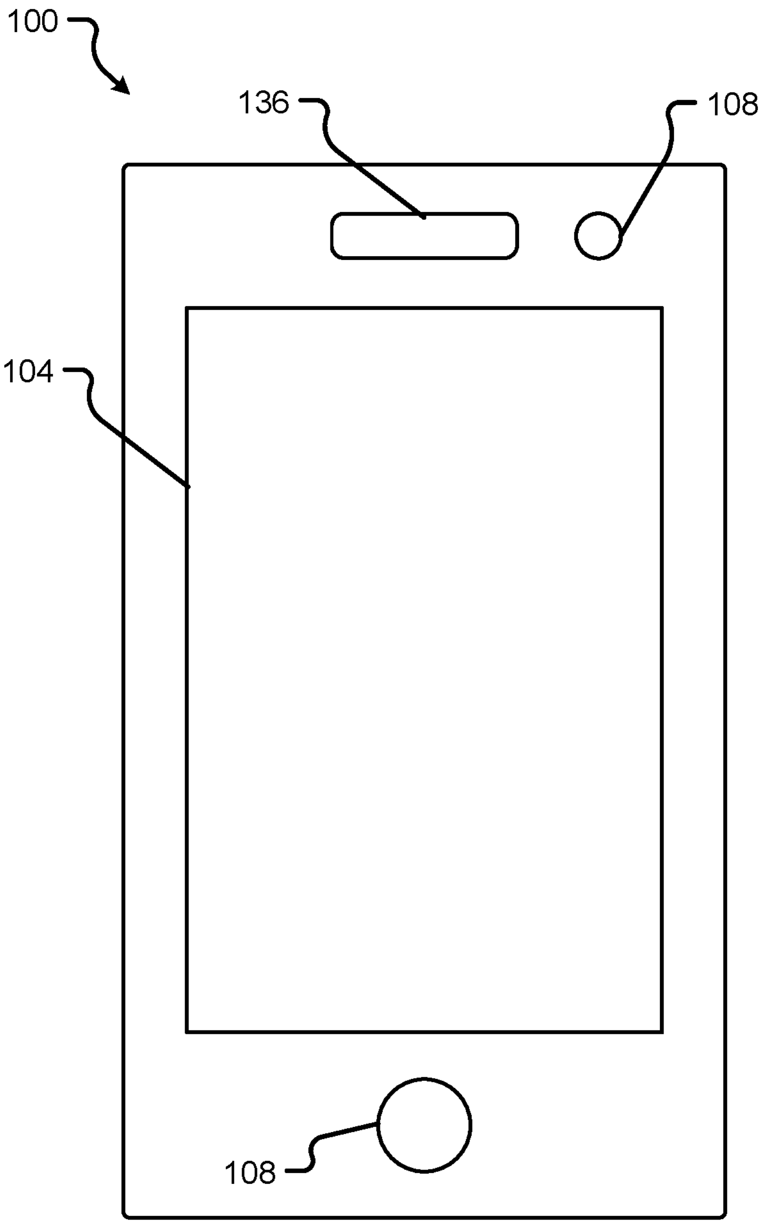
FIG. 1B depicts another example of a computational device in accordance with embodiments of the present disclosure.

With reference now to FIGS. 1A and 1B, an illustrative computational device 100 that may be used to implement a slot game and mirror operation or the like will be described in accordance with at least some embodiments of the present disclosure. A computational device 100 may include a portable or non-portable device used for executing a gaming application or multiple different gaming applications without departing from the scope of the present disclosure. Non-limiting examples of a computational device include an EGM, a VGM, a mobile communication device (e.g., a smartphone, laptop, wearable device, etc.), a laptop, a PC, etc. An EGM or VGM-type of computational device 100 is shown in FIG. 1A in accordance with embodiments of the present disclosure.

The illustrative computational device 100 of FIG. 1A is shown to include a support structure, housing or cabinet, which provides support for a plurality of displays, inputs, controls and other features of a conventional gaming machine. In the illustrated embodiment, a player plays computational device 100 while sitting, however, the computational device 100 is alternatively configured so that a player can operate it while standing or sitting. The illustrated computational device 100 is positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The computational device 100 can be constructed with varying cabinet and display configurations.

In one embodiment, a computational device 100 is configured to randomly generate awards and/or other game outcomes based on probability data. Since a computational device 100 generates outcomes randomly or based upon a probability calculation, there is no certainty that the computational device 100 will provide the player with any specific award or other game outcome.

In some embodiments, a computational device 100 may employ a predetermined or finite set or pool of awards, progressive awards, prizes or other game outcomes. As each award or other game outcome is provided to the player, the computational device 100 removes the provided award or other game outcome from the predetermined set or pool. Once removed from the set or pool, the specific provided award or other game outcome cannot be provided to the player again. The computational device 100 provides players with all of the available awards or other game outcomes over the course of the play cycle and guarantees a designated amount of actual wins and losses.

The computational device 100 may include one or more displays 112. An illustrative display 112 may include a credit display that displays a player's current number of credits, cash, account balance or the equivalent. Another illustrative display 112 may include a bet display that displays a player's amount wagered.

The computational device 100 is also shown to include at least one payment acceptor. Illustrative payment acceptors may include, without limitation, a coin slot 124, where the player inserts coins or tokens, and a ticket, note or bill acceptor 128, where the player inserts a bar-coded ticket, note, or cash. In one embodiment, a player-tracking card, credit card, debit card or data card reader/validator 132 is also provided for accepting any of those or other types of cards as a form of payment toward playing a game on the computational device 100.

In one embodiment, a player inserts an identification card into card reader 132 of computational device 100. The identification card can be a smart card having a programmed microchip or a magnetic strip coded with a player's identification, credit totals and other relevant information. In one embodiment, money may be transferred to computational device 100 through an electronic fund transfer and card reader 132 using the player's credit, debit or smart card. When a player funds computational device 100, a processor of the computational device 100 may determine the amount of funds entered and the corresponding amount is shown on the credit or other suitable display 112 as described above.

In one embodiment, after appropriate funding of computational device 100, the player presses a user input 108 to initiate game play. User inputs 108 may include various types of buttons, levers, gesture inputs, etc. that enable a player to start any game play or sequence of events. In one embodiment, upon appropriate funding, computational device 100 begins game play automatically. In another embodiment, the player needs to actuate or activate one of the play buttons to initiate play of computational device 100. Other non-limiting types of user inputs 108 may include a bet one button, a max bet button, or any other type of button known to be included in an EGM, VGM, or the like. In some embodiments, the player places a bet by pushing a bet one button. The player may increase the player's wager by one credit each time the player pushes bet one button. When the player pushes the bet one button, the number of credits shown in the credit display decreases by one, and the number of credits shown in the bet display increases by one. A max bet max button can also be provided, which enables the player to bet the maximum wager (e.g., max lines, max wager per line, and mirror operation), computational device 100 may include other suitable wager buttons, such as a repeat bet button, one or more select pay lines buttons, a select mirror operation button, and one or more select wager per pay line buttons.

Another type of user input 108 that may be provided on the computational device 100 is a cash out button. The player presses a cash out button and cashes out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The computational device 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a computational device 100 provides dynamic sounds coupled with attractive multimedia images displayed on display screen 104 to provide an audio-visual representation or to otherwise display full-motion video with sound to attract players to computational device 100. During idle periods, the computational device 100 displays a sequence of audio and/or visual attraction messages to attract potential players to computational device 100.

In one embodiment, a base or primary game includes a slot game with one or more pay lines 120. As will be discussed in further detail herein, the game provided by the computational device 100 may support one or multiple pay lines 120, which may extend across the display screen 104 vertically, horizontally, diagonally, at adjusted angles, etc. In some embodiments, such as for a slot game, a pay line 120 intersects a plurality of reels 116, such as three to five reels. Each reel 116 of the display screen 104 may be used to display different sets of symbols in connection with game play activity provided by the computational device 100. In some embodiments, each reel 116 may operate independent of all other reels and the symbols displayed by a reel 116 at the end of a given spin may depend upon random numbers generated by the computational device 100.

The reels 116 may be provided as mechanical rotating reels, electromechanical rotating reels, and/or in video form with simulated reels being displayed via the display screen 104. A reel 116 may be used to display any number of symbols such as bells, hearts, fruits, numbers, letters, bars or other images, which preferably correspond to a theme associated with a game provided by the computational device 100. With a slot game, computational device 100 may be configured to award prizes, awards, or other game play opportunities when the reels 116 stop spinning and a predetermined symbol combination lands across an active pay line 120 (e.g., a pay line 120 that is currently being wagered and is subject to evaluation for a win after the reels 116 have stopped spinning).

FIG. 1B illustrates another example of a computational device 100 in accordance with at least some embodiments of the present disclosure. This particular example of computational device 100 may correspond to a portable computational device 100 such as a mobile smartphone, tablet, wearable, etc. The computational device 100 may be owned by a user of the device 100 rather than being owned by a casino operator.

The computational device 100 again includes a display screen 104, a plurality of user inputs 108, and at least one speaker 136. In some embodiments, the display screen 104 may correspond to a touch-sensitive display screen, meaning that the display screen 104 is simultaneously capable of displaying information (e.g., in connection with game play activity) and receiving a user input. In some embodiments, the touch-sensitive display screen 104 may provide game features similar to a cabinet-style computational device 100 without requiring all of the dedicated buttons provided by a cabinet-style computational device 100.

Figure 2:
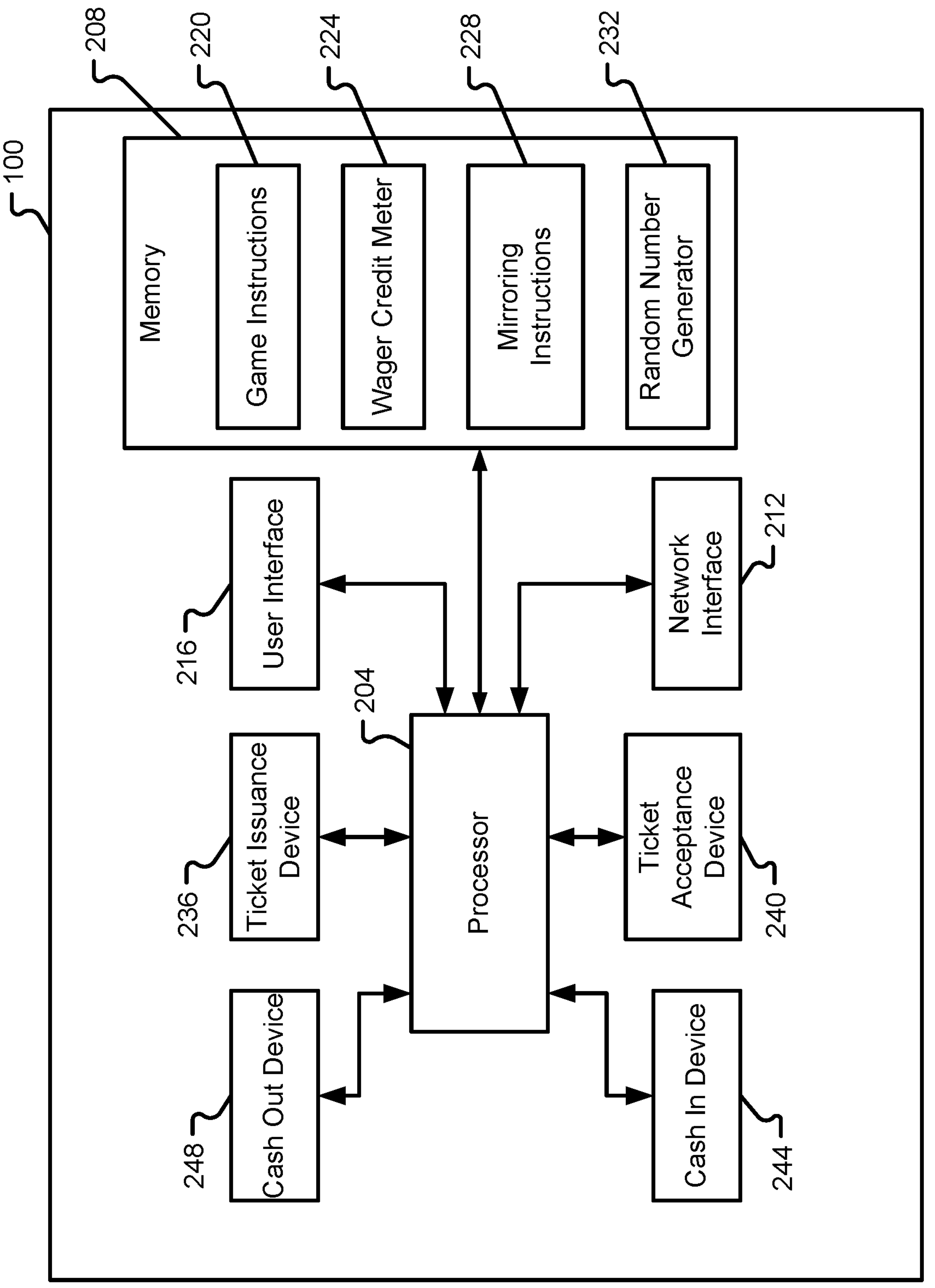
FIG. 2 is a block diagram depicting components of a computational device in accordance with embodiments of the present disclosure.

With reference now to FIG. 2, additional details of the components that may be included in a computational device 100 will be described in accordance with at least some embodiments of the present disclosure. The computational device 100 is shown to include a processor 204, memory 208, a network interface 212, and a user interface 216. In some embodiments, the processor 204 may correspond to one or many microprocessors, CPUs, microcontrollers, Integrated Circuit (IC) chips, or the like. The processor 204 may be configured to execute one or more instruction sets stored in memory 208. In some embodiments, the instruction sets stored in memory 208, when executed by the processor 204, may enable the computational device 100 to provide game play functionality.

The nature of the network interface 212 may depend upon whether the network interface 212 is provided in cabinet-style computational device 100 or a mobile computational device 100. Examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the computational device 100 is connecting to a single communication network or multiple different types of communication networks. For instance, the computational device 100 may be provided with both a wired network interface 212 and a wireless network interface 212 without departing from the scope of the present disclosure.

The user interface 216 may include a combination of the user input and user outputs described in connection with FIGS. 1A and 1B. For instance, the user interface 216 may include the display screen 104, the user inputs 108, the speakers 136, or any other component that is capable of enabling user interaction with the computational device 100. The user interface 216 may also include one or more drivers for the various hardware components that enable user interaction with the computational device 100.

The memory 208 may include one or multiple computer memory devices that are volatile or non-volatile. The memory 208 may be configured to store instruction sets that enable player interaction with the computational device 100 and that enable game play at the computational device 100. Examples of instruction sets that may be stored in the memory 208 include a game instruction set 220, a credit meter 224, and a mirroring instruction set 228. In addition to the instruction sets, the memory 208 may also be configured to store a random number generator 232 that is used by the game instruction set 220, for example, to provide game outputs.

In some embodiments, the game instruction set 220, when executed by the processor 204, may enable the computational device 100 to facilitate one or more games of chance or skill and produce interactions between the player and the game of chance or skill. In some embodiments, the game instruction set 220 may include subroutines that present one or more graphics to the player via the user interface 216, subroutines that calculate whether a particular wager has resulted in a win or loss during the game of chance or skill, subroutines for determining payouts for the player in the event of a win, subroutines for exchanging communications with another device, such as a server, subroutines for determining bonus spin opportunities during game play, and any other subroutine useful in connection with facilitating game play at the computational device 100.

In some embodiments, the game instruction set 220 may include instructions that initiate a reel spin at the various reels 116 in connection with game play. In some embodiments, the random number generator 232 is used to determine a final position of the reels 116 after the spin is completed. The game instruction set 220 may also be configured to present symbols via the display screen 104 when the reels 116 correspond to video reels or the like. The game instruction set 220 may also be configured to evaluate a position of symbols relative to one or more pay lines 120, relative to predetermined symbol areas, and any other evaluation desired to facilitate game play.

The credit meter 224 may correspond to an instruction set within the computational device 100 that facilitates a tracking of wager activity at the computational device 100. In some embodiments, the credit meter 224 may be used to store or log information related to various player activities and events that occur at the computational device 100. The types of information that may be maintained in the credit meter 224 include, without limitation, player information, available credit information, wager amount information, and other types of information that may or may not need to be recorded for purposes of accounting for wagers placed at the computational device 100 and payouts made for a player during a game of chance or skill played at the computational device 100.

In some embodiments, the credit meter 224 may be configured to track coin in activity, coin out activity, coin drop activity, jackpot paid activity, credits applied activity, external bonus payout activity, voucher in activity, voucher out activity, timing of events that occur at the computational device 100, and the like. In some embodiments, certain portions of the credit meter 224 may be updated in response to outcomes of a game of chance or skill played at the computational device 100.

The mirroring instruction set 228 may correspond to a subroutine that is called by the game instruction set 220 during game play. In some embodiments, the mirroring instruction set 228 may be configured to identify a first position of symbols across the display screen 104, identify a mirror axis across which to perform a mirror operation, and then apply the mirror operation (or multiple mirror operations) as will be described in further detail herein. It should be appreciated that, in some embodiments, the mirroring instruction set 228 may be incorporated as part of the game instruction set 228. In other embodiments, the mirroring instruction set 228 may be maintained as a separate instruction set. The mirroring instruction set 228 may solely be responsible for applying a mirror operation on displayed symbols whereas the game instruction set 220 may be responsible for determining whether or not a position of symbols before and after a mirror operation results in a predetermined game outcome or prize. In some embodiments, the mirroring instruction set 228 may be configured to utilize the random number generator 232 as part of determining what type of mirror operation to apply, where to place a mirror axis, how to orient a mirror axis, or combinations thereof. Additional details and functional capabilities of the mirroring instruction set 228 will be described in connection with FIGS. 3-10C.

The computational device 100 is further shown to include a ticket issuance device 236, a ticket acceptance device 240, a cash in device 244, and a cash out device 238. The ticket issuance device 236 may be configured to receive physical tickets, vouchers, or player loyalty cards. In some embodiments, the ticket issuance device 236 and ticket acceptance device 240 may operate in concert with the ticket acceptor 128. In such an embodiment, the ticket acceptor 128 may correspond to the physical components that receive and issue a ticket or voucher whereas the ticket acceptance device 240 and ticket issuance device 236 correspond to the drivers and/or firmware components that control operation of the ticket acceptor 128. It should also be appreciated that the card reader 132 may be in communication with the ticket issuance device 236 and ticket acceptance device 140 and may have functionality driven by one or both of these devices. For instance, the card reader 132 may correspond to the physical hardware components that receive information from a player loyalty card (or player loyalty application on a mobile communication device) and that information may be processed by the ticket acceptance device 240 when receiving player credits from cards read by the card reader 132. The ticket issuance device 236 may provide the card reader 132 with information for applying wager credits back to a player card when a player is done with a game play session and wishes to transfer credits from the credit meter 224 back onto their card. Thus, the ticket issuance device 236 and ticket acceptance device 240 may also operate as a driver and/or firmware component for the card reader 132.

Similarly, the cash in device 244 and cash out device 248 may include or operate in concert with the coin slot 124 and any coin delivery mechanisms. The cash in device 244 and cash out device 248 may include hardware, drivers, or firmware that facilitate receiving or distributing cash, tokens, bills, etc. In some embodiments, the cash in device 244 may be configured to determine an amount of cash (e.g., in coins, bills, etc.), an amount of tokens, etc., input at the coin slot 124 and convert the values into credits for playing games with the game instruction set 220. The cash out device 248 may correspond to hardware and software configured to output coins, tokens, bills, etc. if a player decides to cash out or convert playing credits back into cash, tokens, bills, etc.

Figure 3:
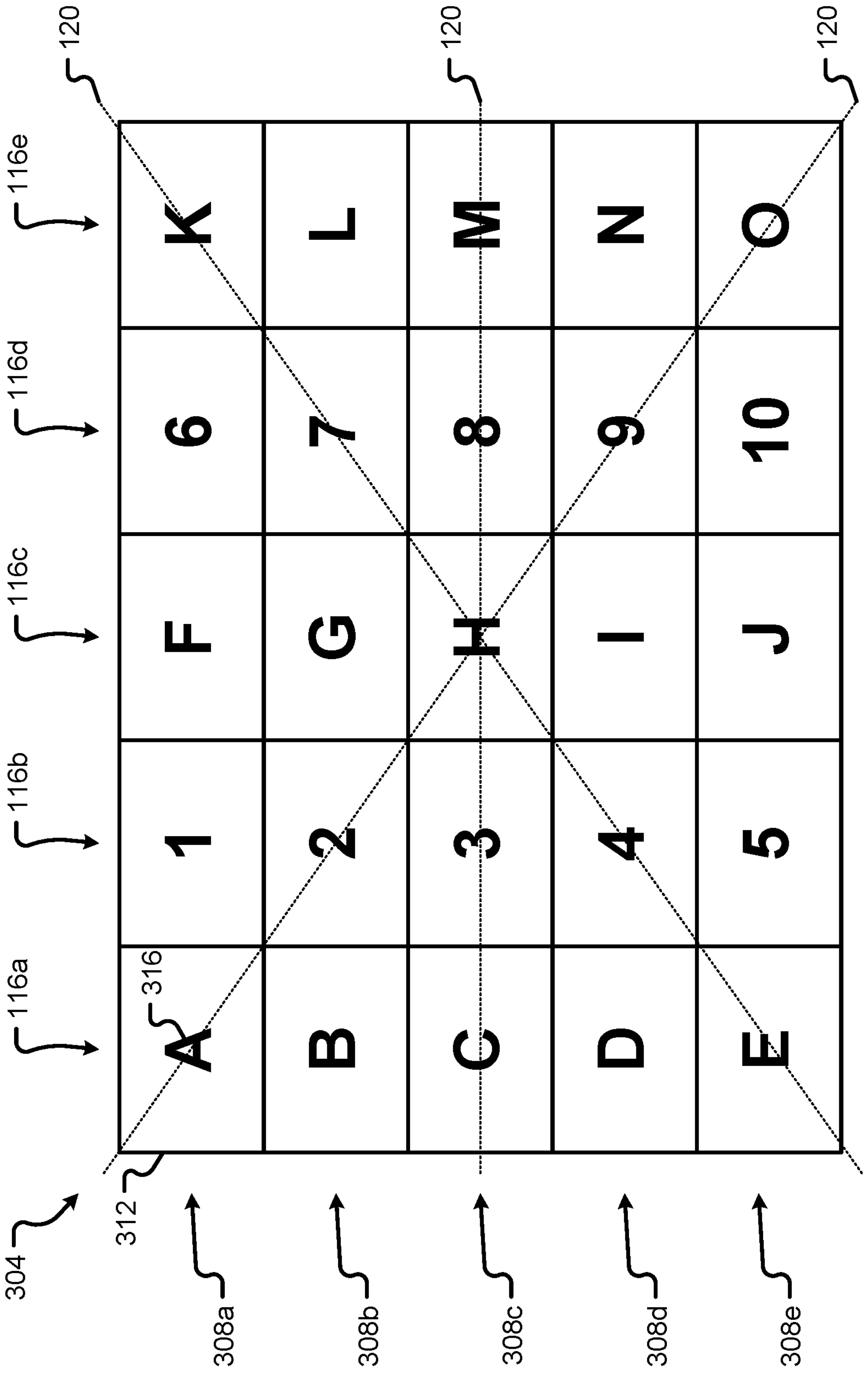
FIG. 3 is an illustrative layout of symbols within an array of symbol areas in accordance with embodiments of the present disclosure.

With reference now to FIGS. 3 to 10C, various operations of the game instruction set 220 and mirroring instruction set 228 will be described in accordance with at least some embodiments of the present disclosure. Referring initially to FIG. 3, a first layout of an array of symbol areas 304 will be described in accordance with embodiments of the present disclosure. The array of symbol areas 304 may be presented with the display screen 104. In some embodiments, the game instruction set 220 may control which particular symbols 316 are presented within a particular symbol area 312. The illustrative array of symbol areas 304 is shown to include five columns **116*a*, 116*b*, 116*c*, 116*d*, 116*e* of symbol areas 312 and five rows 308*a*, 308*b*, 308*c*, 308*d*, 308*e* of symbol areas 312. Although FIG. 3 illustrates a 5×5 array of symbol areas 304, it should be appreciated that embodiments of the present disclosure can be implemented in an array of symbol areas 304 having a variety of sizes. For instance, embodiments of the present disclosure may be used in an array of symbol areas 304 that are 3×3, 3×5, 5×3, 7×3, 10×5, 10×10, etc. The example layout of the array of symbol areas 304** should not be construed as limiting embodiments of the present disclosure.

As can be seen in FIG. 3, each symbol area 312 in the array of symbol areas 304 may be populated with a single symbol 316. In other words, after the game instruction set 220 has applied a random number generator 232 to determine symbol 316 placement throughout the array of symbol areas 304, there will be a 1:1 correlation of symbols 316 to symbol areas 312. Each column **116*a*, 116*b*, 116*c*, 116*d*, 116*e* may also be referred to as a reel 116, particularly in the event that the game instruction set 220 provides a slot game. If a slot game is implemented, then the reels 116 (mechanical or video) are spun (physically or virtually) and their final position after the spin is determined, at least in part, with assistance of the random number generator 232**.

In some embodiments, payouts or other predetermined game outcomes (e.g., bonus spin opportunities, prize wins, cash wins, mirror bonus play, etc.) may be determined based on a symbol combination that falls on a pay line 120 that was subject to a wager prior to the spin. In some embodiments, a plurality of the pay lines 120 may be selected for "play" prior to a spin, meaning that any pay line 120 selected for "play" will be evaluated for a predetermined symbol combination. A selected pay line 120 may also correspond to the pay line 120 that is evaluated after symbols 316 have been subjected to a mirror operation by the mirroring instruction set 228. In some embodiments, however, it may be possible to switch or select more pay lines 120 for evaluation after a spin has completed, but before a mirror operation has been performed.

Figure 4A:
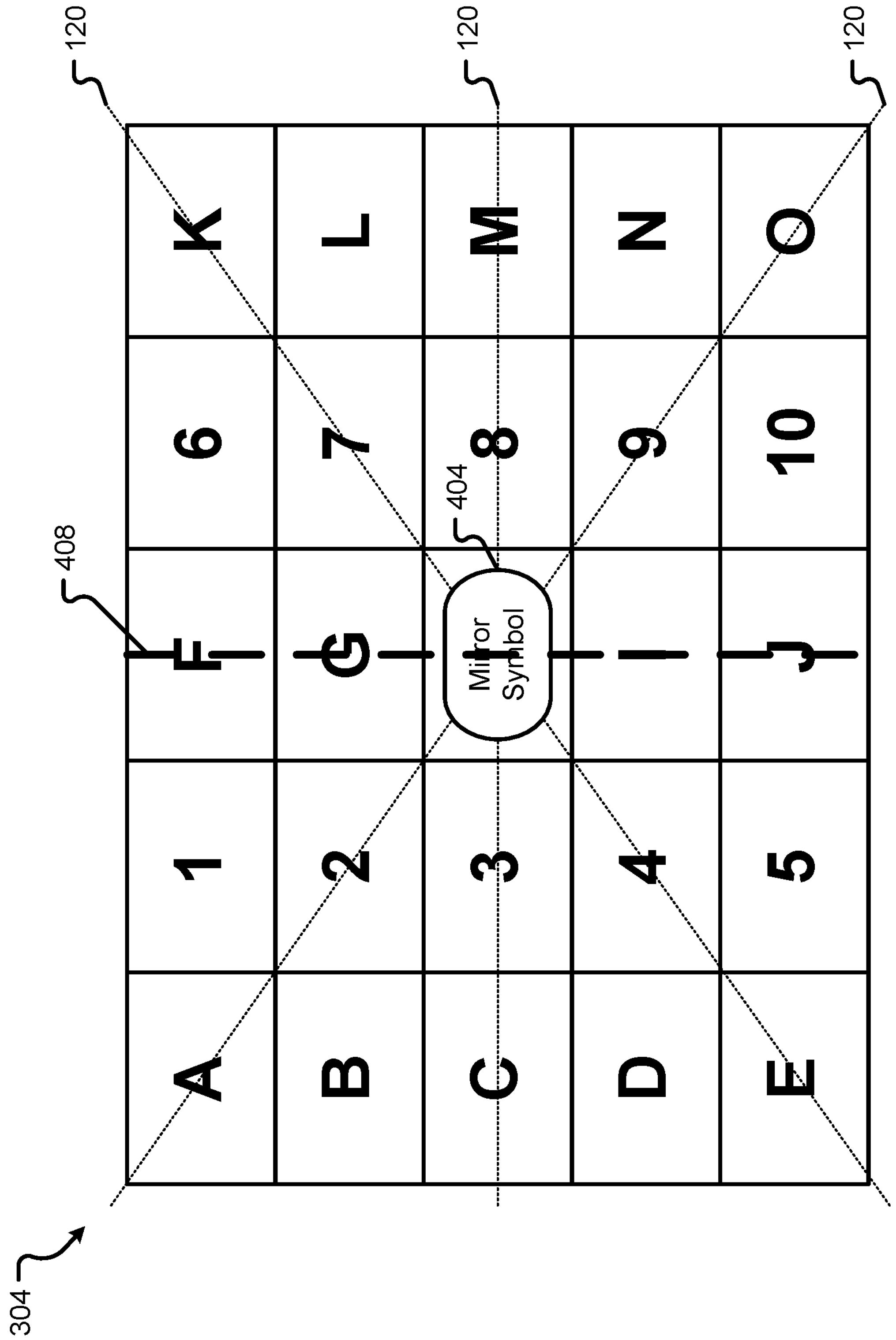
FIG. 4A illustrates a mirror symbol within a predetermined symbol area in accordance with embodiments of the present disclosure.
Figure 4B:
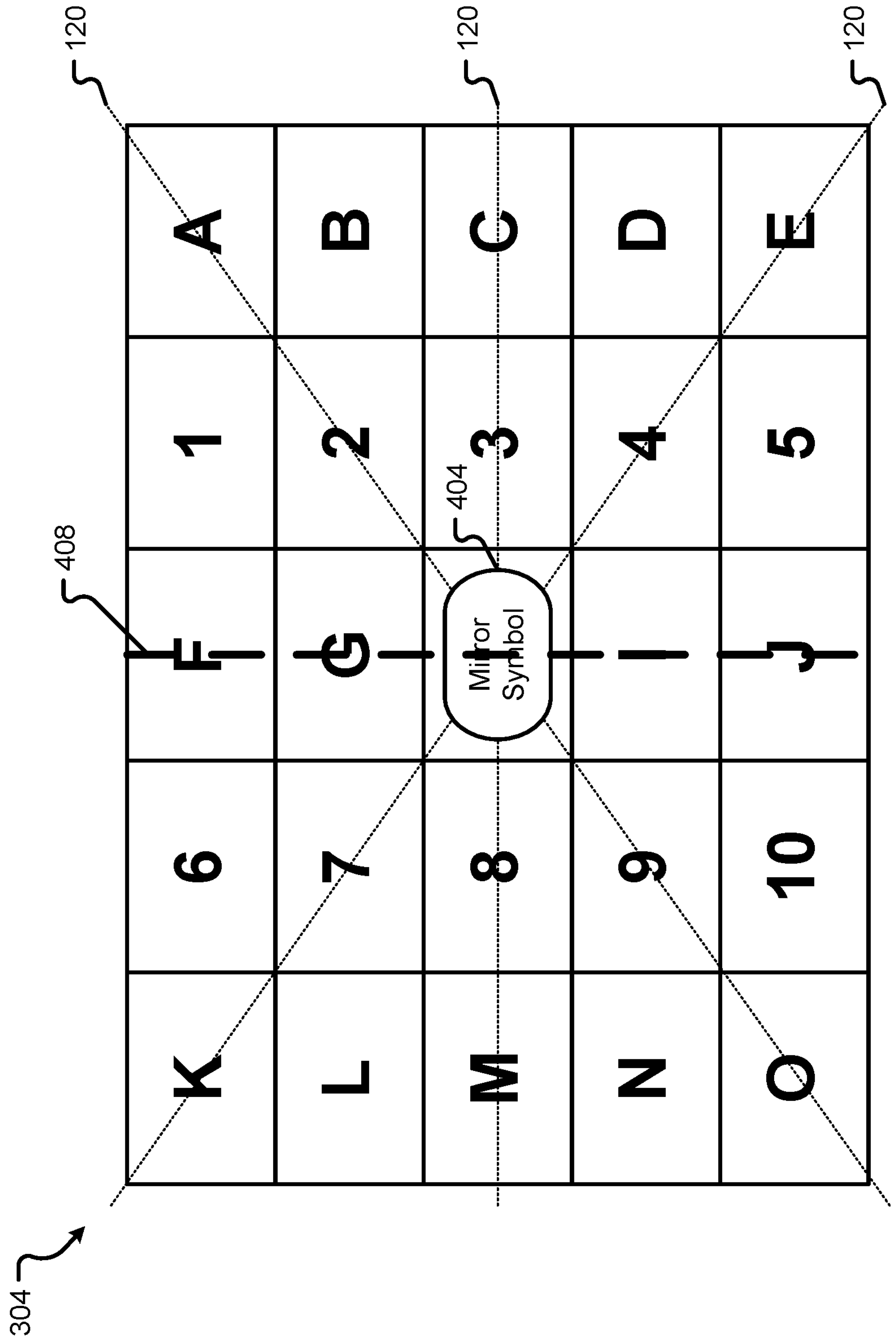
FIG. 4B illustrates a layout of symbols within an array of symbol areas after a first illustrative mirror operation in accordance with embodiments of the present disclosure.

Referring now to FIGS. 4A and 4B, a first illustrative mirror operation that can be performed by the mirroring instruction set 228 will be described in accordance with at least some embodiments of the present disclosure. In the example of FIG. 4A, a predetermined mirror symbol 404 is shown to have landed in the center-most symbol area 312. Thus, in this example, the predetermined mirror symbol 404 may be considered to have landed on a predetermined symbol area 312 that will result in the game instruction set 220 calling the mirroring instruction set 228 to perform a mirror operation. In some embodiments, the game instruction set 220 may require that a mirror symbol 404 land on a selected pay line 120 prior to enabling the mirroring instruction set 228. In some embodiments, the game instruction set 220 may require that a mirror symbol 404 land within any row 308*a-e* of a selected column 116*a-e*, within a selected column 116*a-e* or a selected row 308*a-e*, or within a particular selected symbol area 312 (e.g., the third row 308*c* of the fourth column 116*d*).

In some embodiments, when the game instruction set 220 calls the mirroring instruction set 228, the mirroring instruction set 228 identifies a mirror axis 408 across which the symbols in the array of symbol areas 304 will be mirrored. In a non-limiting embodiment, the mirror axis 408 may pass through the symbol area 312 in which the mirror symbol 404 landed. The example of FIG. 4A shows the mirror axis 408 to be vertically oriented and passing through the symbol area 312 having the mirror symbol 404.

The mirroring instruction set 228 may then apply the mirror operation to the symbols in the array of symbol areas 304 across the mirror axis 408. As shown in FIG. 4B, after the mirror operation is performed, the symbols 316 that were originally populating the first column 116*a* move to the fifth column 116*e*, and vice versa. Likewise, after the mirror operation is performed, the symbols 316 that were originally populating the second column 116*b* move to the fourth column 116*d*, and vice versa. In some embodiments, the mirror operation may or may not necessarily result in a different symbol combination landing on a selected pay line 120. For instance, if only the horizontal pay line 120 (e.g., the pay line 120 passing through the third row 308*c* of symbols) is evaluated for a winning symbol combination before and after a mirror operation, then the symbols 316 that land on the horizontal pay line 120 will be the same before and after the mirror operation; however, if another pay line 120 (e.g., one of the diagonal pay lines 120) corresponds to a selected pay line 120, then the symbol combination landing on the selected pay line 120 will be different after the mirror operation.

Figure 5A:
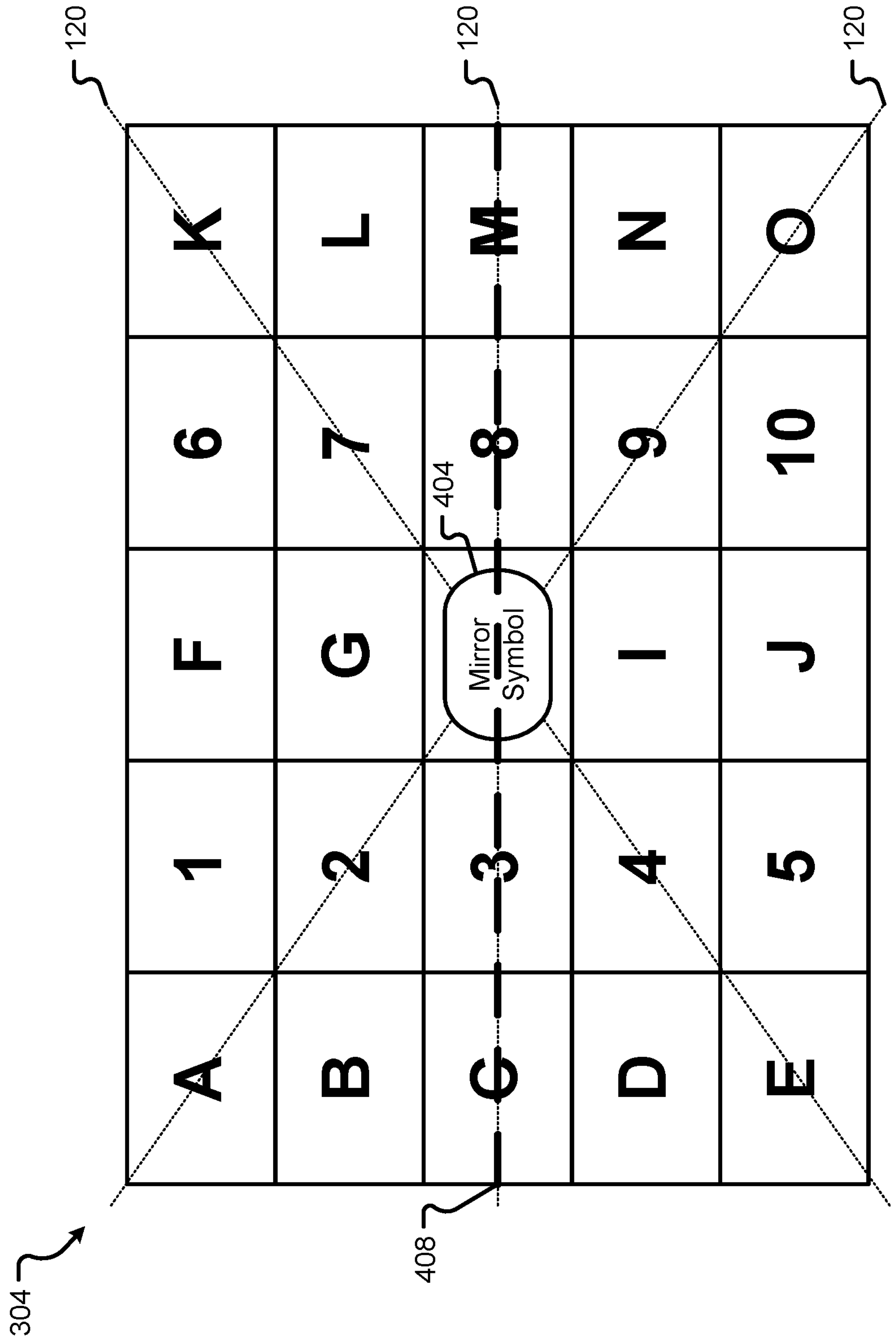
FIG. 5A illustrates a mirror symbol within a predetermined symbol area in accordance with embodiments of the present disclosure.
Figure 5B:
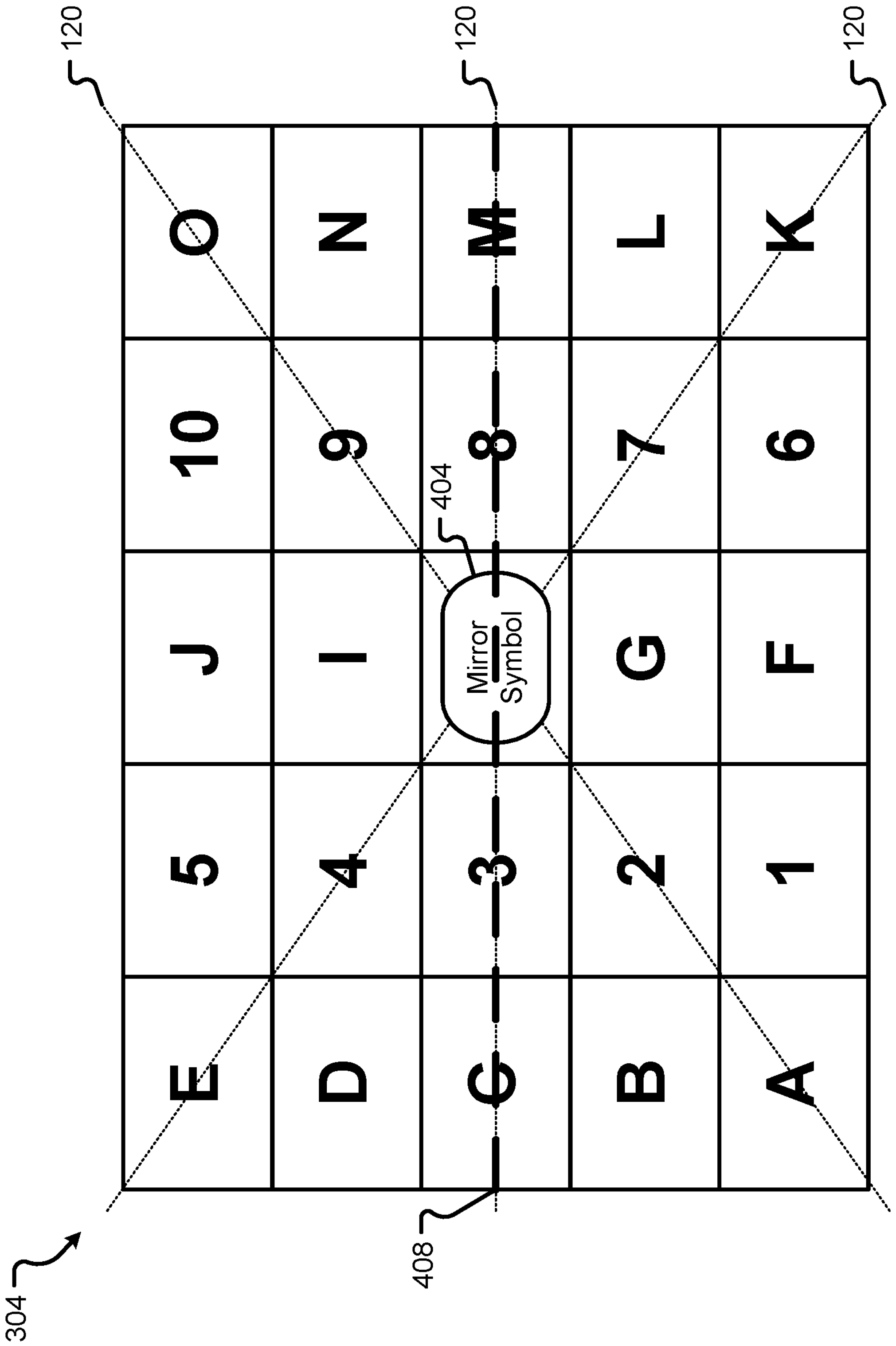
FIG. 5B illustrates a layout of symbols within an array of symbol areas after a second illustrative mirror operation in accordance with embodiments of the present disclosure.

Referring now to FIGS. 5A and 5B, a second illustrative mirror operation that can be performed by the mirroring instruction set 228 will be described in accordance with at least some embodiments of the present disclosure. In this example, the mirror symbol 404 is shown to land in the same symbol area 312 as in the previous example, but the mirror axis 408 is shown to have a horizontal orientation rather than a vertical orientation. Thus, as shown in FIG. 5B, after the mirror operation is performed by the mirroring instruction set 228, the rows 308*a*, 308*b*, 308*d*, and 308*e* have their symbols 316 repositioned across the mirror axis 408 whereas the third row 308*c* does not have any symbol 316 repositioned. A mirror operation of this type may result in a different symbol combination landing on diagonal pay lines 120, but not along the horizontal pay line 120.

Figure 6A:
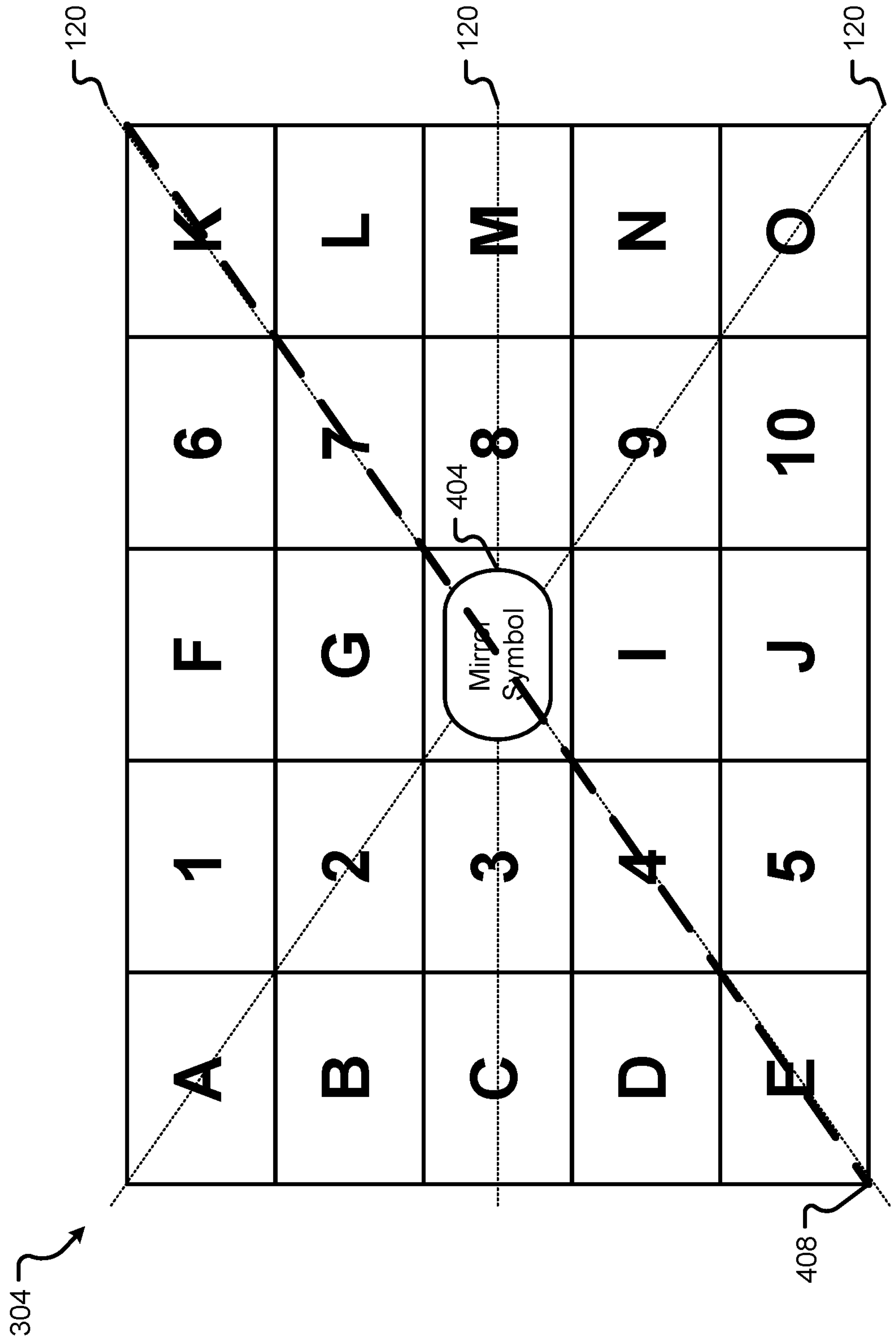
FIG. 6A illustrates a mirror symbol within a predetermined symbol area in accordance with embodiments of the present disclosure.
Figure 6B:
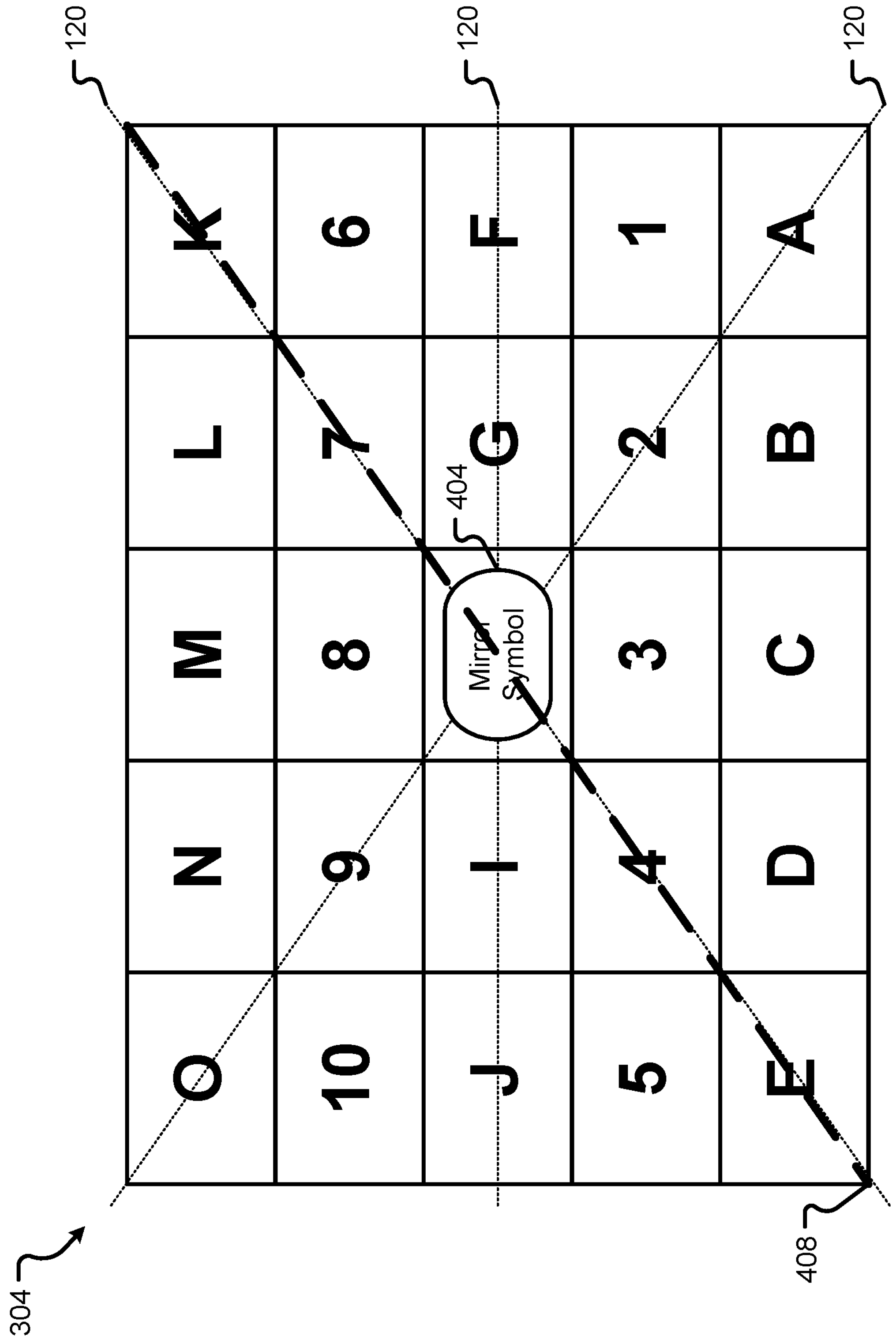
FIG. 6B illustrates a layout of symbols within an array of symbol areas after a third illustrative mirror operation in accordance with embodiments of the present disclosure.

Referring now to FIGS. 6A and 6B, a third illustrative mirror operation that can be performed by the mirroring instruction set 228 will be described in accordance with at least some embodiments of the present disclosure. This particular mirror operation shows the mirror axis 408 having a diagonal orientation. In this particular example, the mirror axis 408 again passes through the symbol area 312 having the mirror symbol 404, although this is not a requirement. As can be seen in FIG. 6B, after the mirror operation, the symbols 316 are mirrored diagonally. This type of mirror operation may result in a different symbol combination landing on the horizontal pay line 120, but possibly not the diagonal pay lines 120.

In each of the examples of FIGS. 4A through 6B, any symbol area 312 not bisected by the mirror axis 408 is subject to symbol 316 repositioning by way of the mirror operation. The symbol areas 312 subjected to symbol 316 repositioning may correspond to selected symbol areas 312 as described herein. It should be appreciated that not every such symbol area 312 needs to correspond to a selected symbol area 312. Examples of this will now be described in accordance with at least some embodiments of the present disclosure.

Figure 7A:
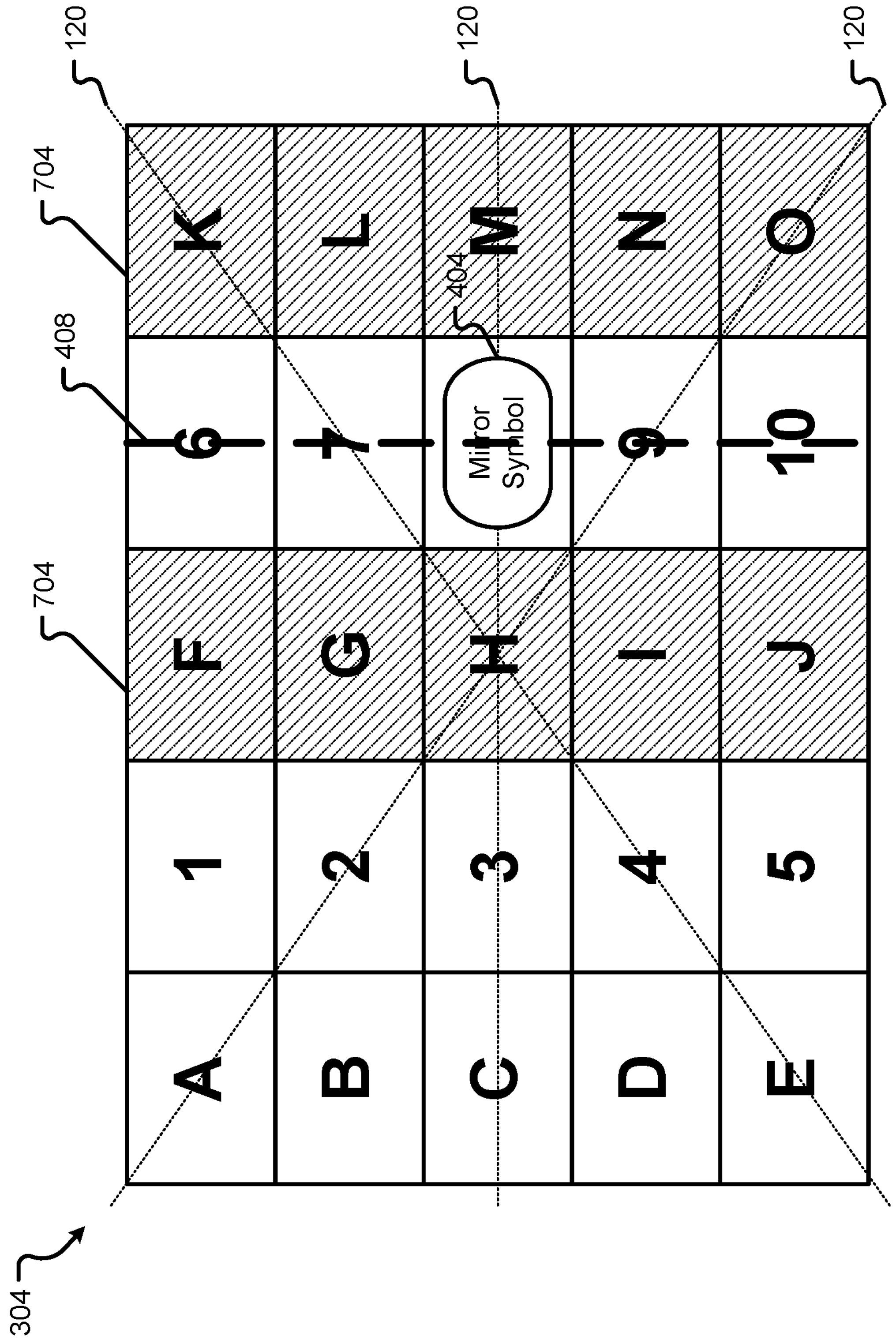
FIG. 7A illustrates a mirror symbol within a predetermined symbol area in accordance with embodiments of the present disclosure.
Figure 7B:
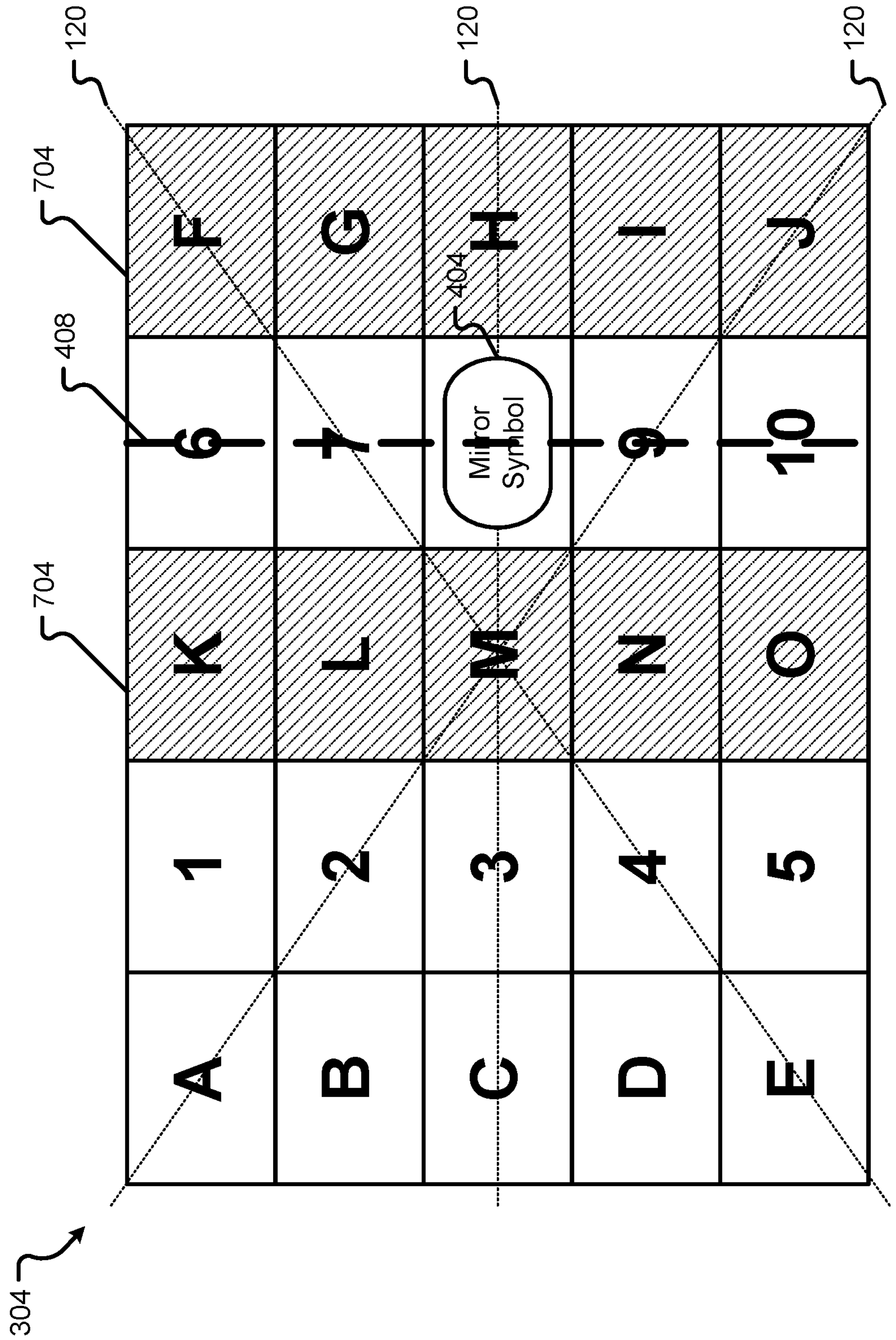
FIG. 7B illustrates a layout of symbols within an array of symbol areas after a fourth illustrative mirror operation in accordance with embodiments of the present disclosure.

Referring now to FIGS. 7A and 7B, a fourth illustrative mirror operation that can be performed by the mirroring instruction set 228 will be described in accordance with at least some embodiments of the present disclosure. In this example, the mirror symbol 404 is shown to have landed on the fourth column 116*d*. Also in this example, the vertically-oriented mirror axis 408 is determined to pass through the symbol area 312 having the mirror symbol 404. This is not a requirement, however. In the depicted example of FIGS. 7A and 7B, when the mirror symbol 404 lands in a symbol area 312 that does not have an equal number of symbols on both of its sides, then a subset of symbol areas 704 may be selected for the mirror operation. In this particular example, the columns 116*c*, 116*d* adjacent to the mirror axis 408 correspond to the subset of symbol areas 704 that will be selected for the mirror operation. Thus, as shown in FIG. 7B, after the mirror operation, the symbols from the third column 116*c* are switched with the symbols from the fifth column 116*e*. It should be appreciated that by having an offset between the mirror axis 408 and the pay line(s) 120, then more pay lines 120 will have different combinations of symbols 316 before and after the mirror operation. Such a configuration may result in a greater sense of excitement for the player of the game.

Figure 8A:
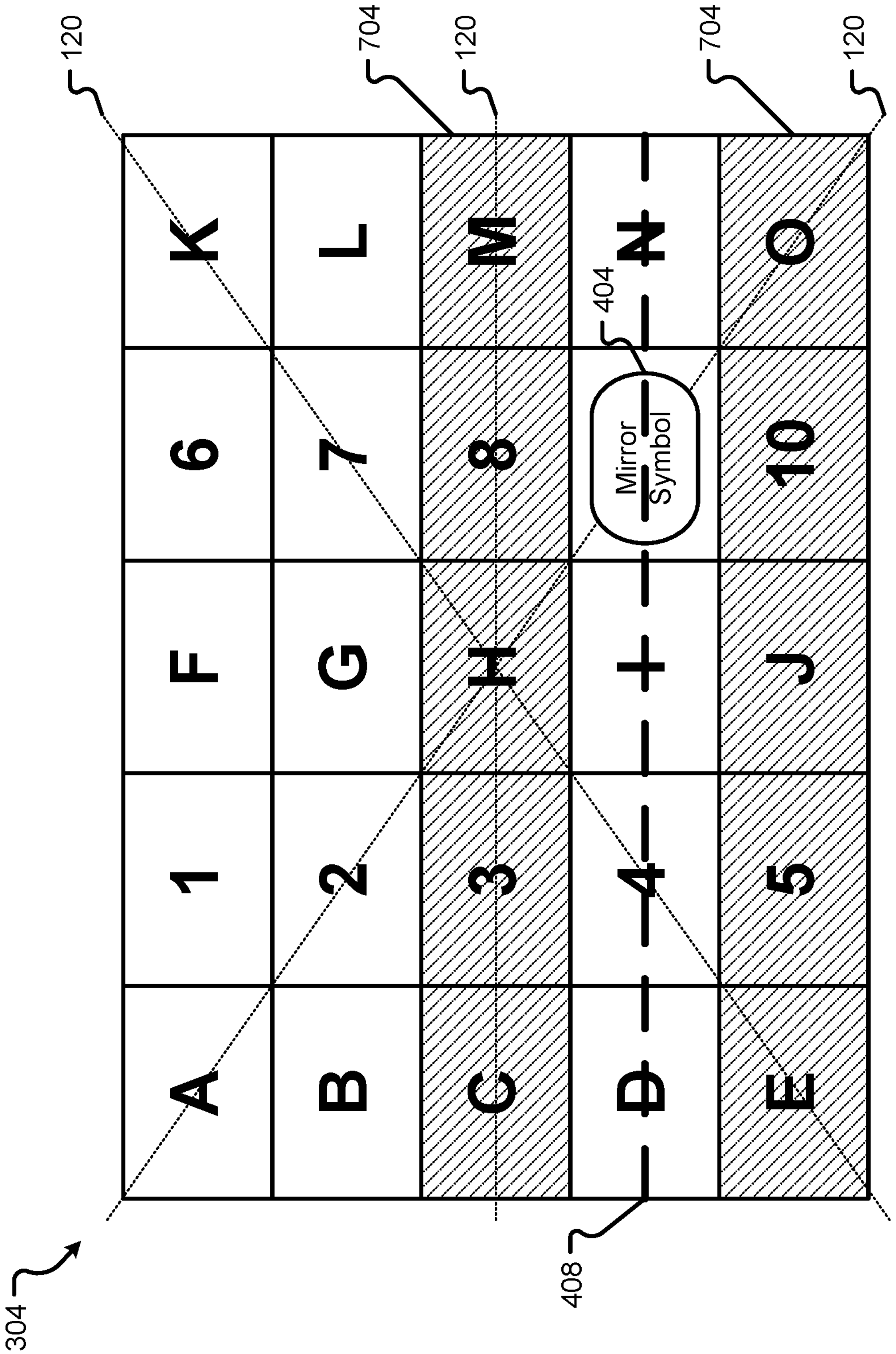
FIG. 8A illustrates a mirror symbol within a predetermined symbol area in accordance with embodiments of the present disclosure.
Figure 8B:
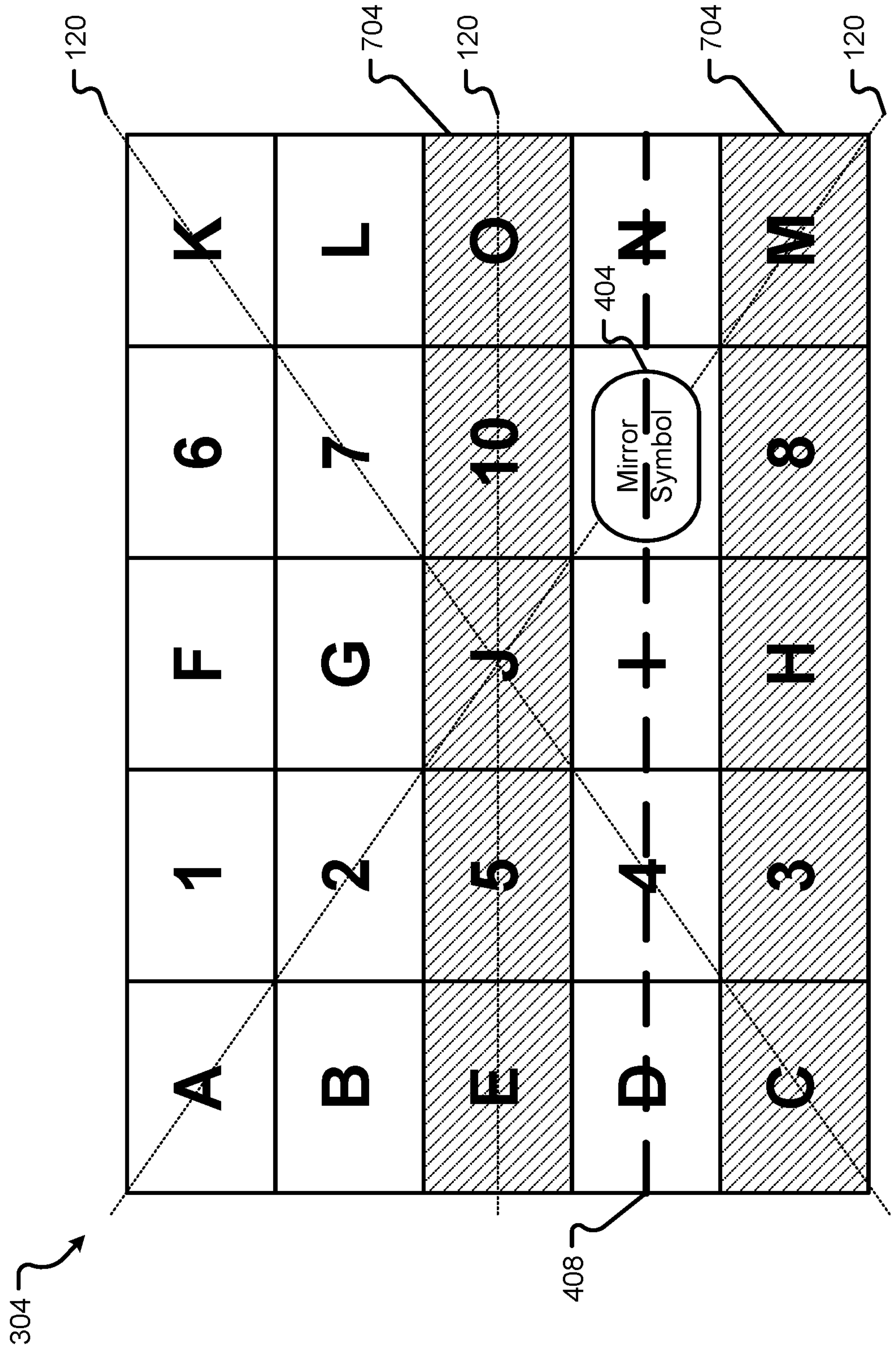
FIG. 8B illustrates a layout of symbols within an array of symbol areas after a fifth illustrative mirror operation in accordance with embodiments of the present disclosure.

Referring now to FIGS. 8A and 8B, a fifth illustrative mirror operation that can be performed by the mirroring instruction set 228 will be described in accordance with at least some embodiments of the present disclosure. In this example, the mirror symbol 404 has landed in the fourth row 308*d* of the fourth column 116*d*. Also in this example, the mirror axis 408 is shown to have a horizontal orientation. Thus, the subset of symbol areas 704 selected for the mirror operation may correspond to symbol areas 312 belonging to the rows 308*c*, 308*e* that are adjacent to the mirror axis 408. As shown in FIG. 8B, after the mirror operation, all symbols 316 on the horizontal pay line 120 are different from before the mirror operation. This occurs because the mirror axis 408 is parallel but not overlapping with the horizontal pay line 120.

Figure 9A:
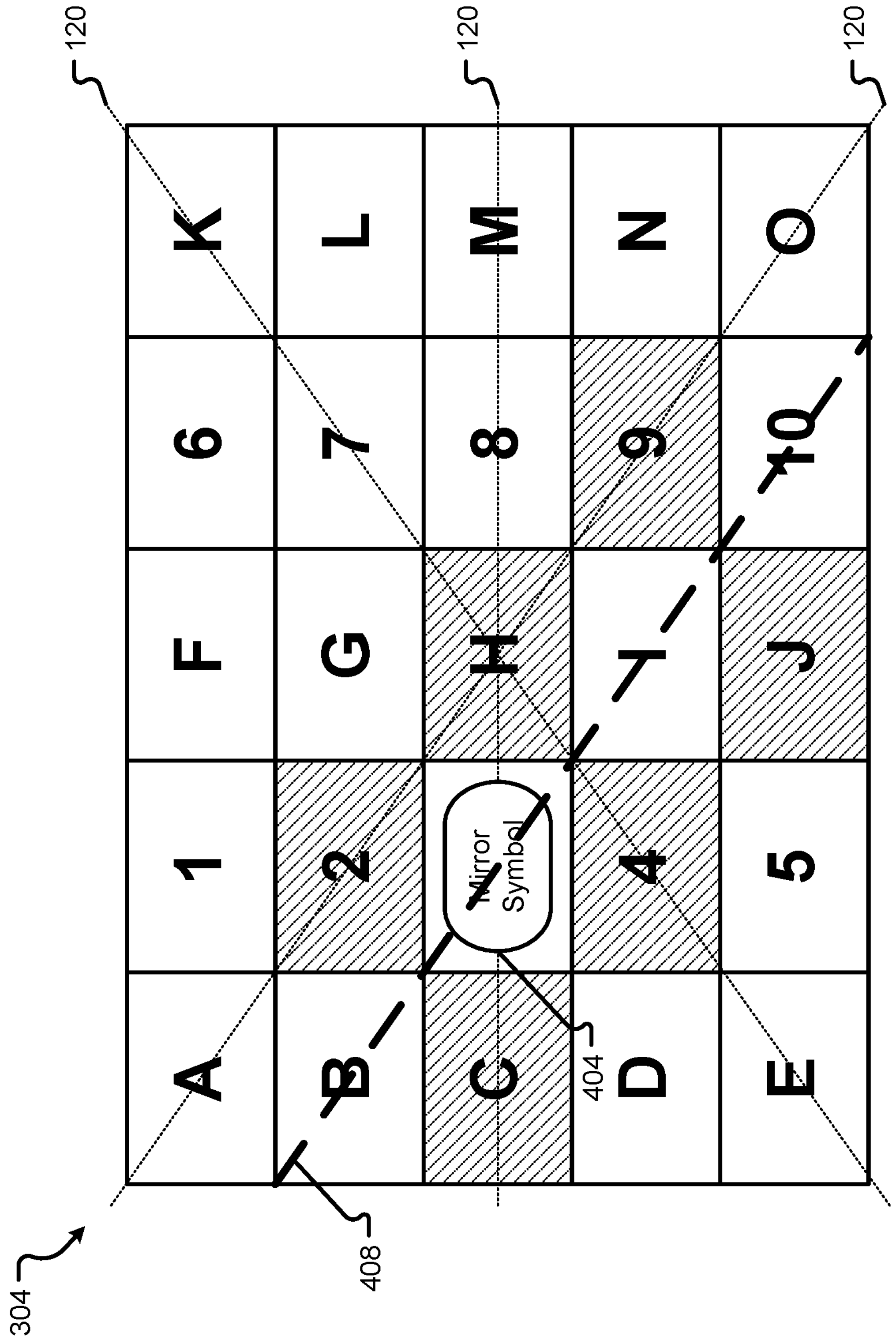
FIG. 9A illustrates a mirror symbol within a predetermined symbol area in accordance with embodiments of the present disclosure.
Figure 9B:
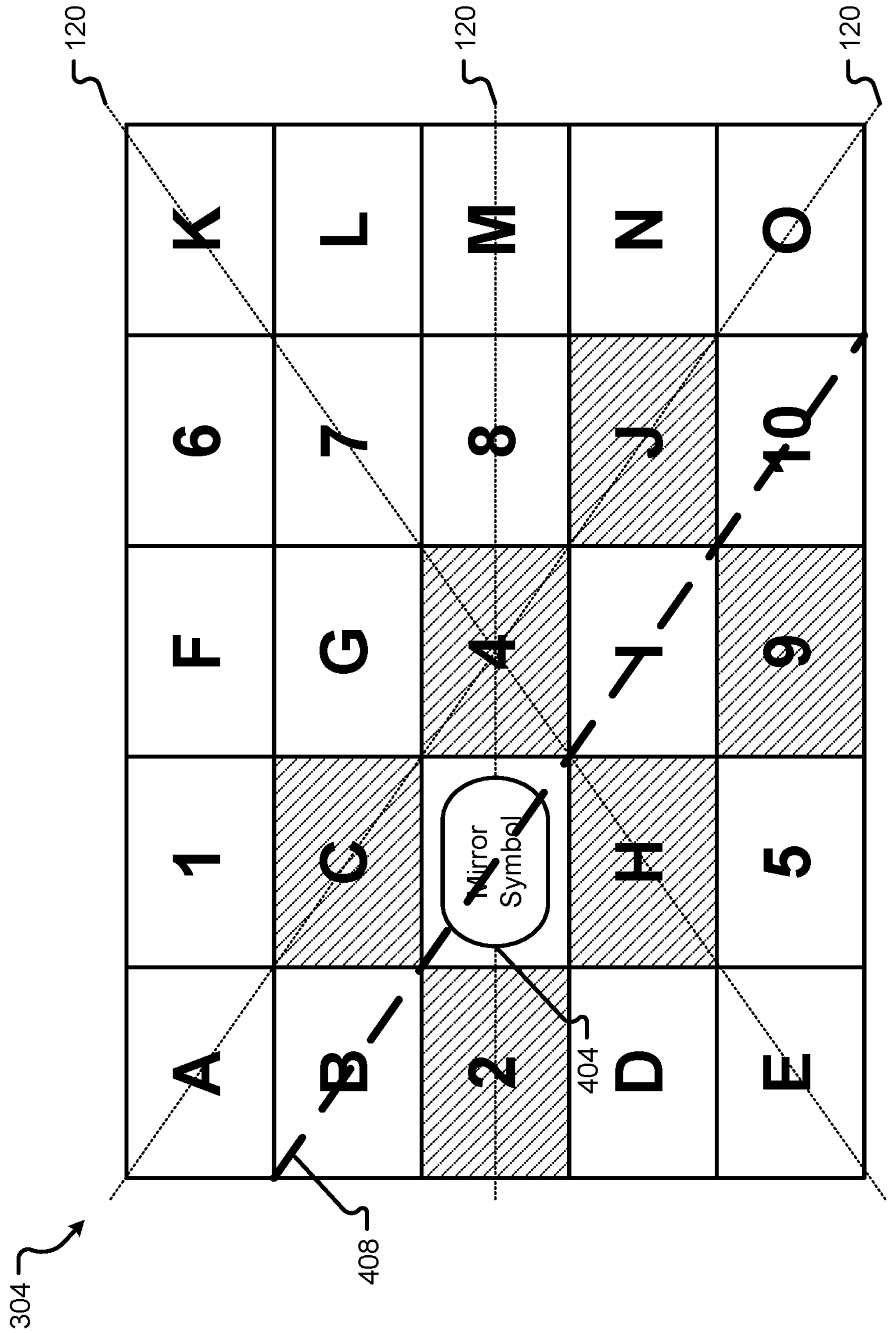
FIG. 9B illustrates a layout of symbols within an array of symbol areas after a sixth illustrative mirror operation in accordance with embodiments of the present disclosure.

Referring now to FIGS. 9A and 9B, a sixth illustrative mirror operation that can be performed by the mirroring instruction set 228 will be described in accordance with at least some embodiments of the present disclosure. In this particular example, the mirror symbol 404 has landed on the second column 116*b* and the mirror axis 408 is diagonally oriented and only bisecting two of the three depicted pay lines 120. With the diagonally oriented pay line 120, the symbol areas 312 subjected to the mirror operation may also be diagonally-oriented and adjacent to the mirror axis 408. As can be seen in FIG. 9B, after the mirror operation, the downward diagonal pay line 120 receives only three new symbols 316 because the symbols 316 in the first column 116*a* and fifth column 116*e* are not within a symbol area 312 subject to the mirror operation.

Figure 10A:
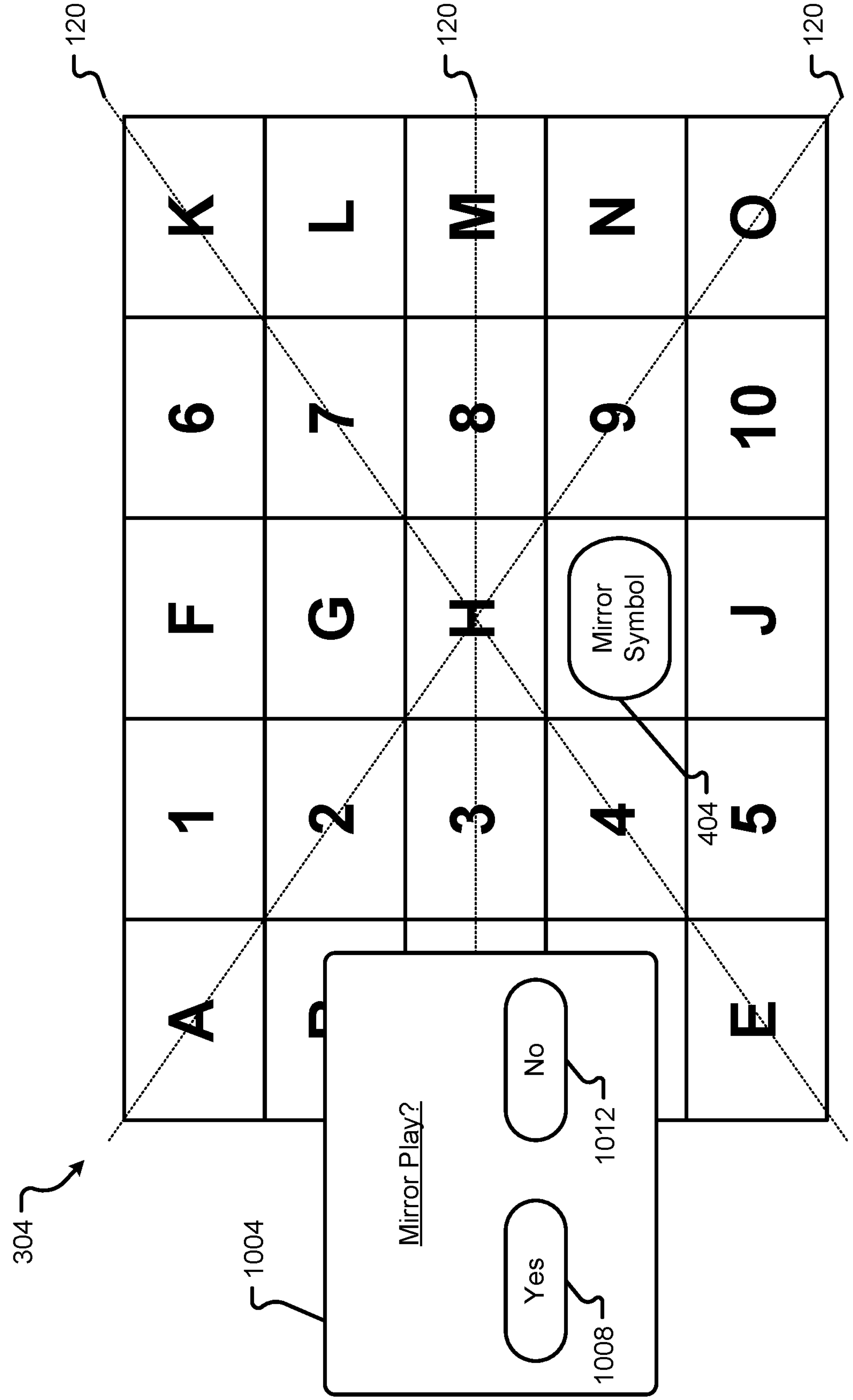
FIG. 10A illustrates a pop-up window with a user prompt in accordance with embodiments of the present disclosure.
Figure 10B:
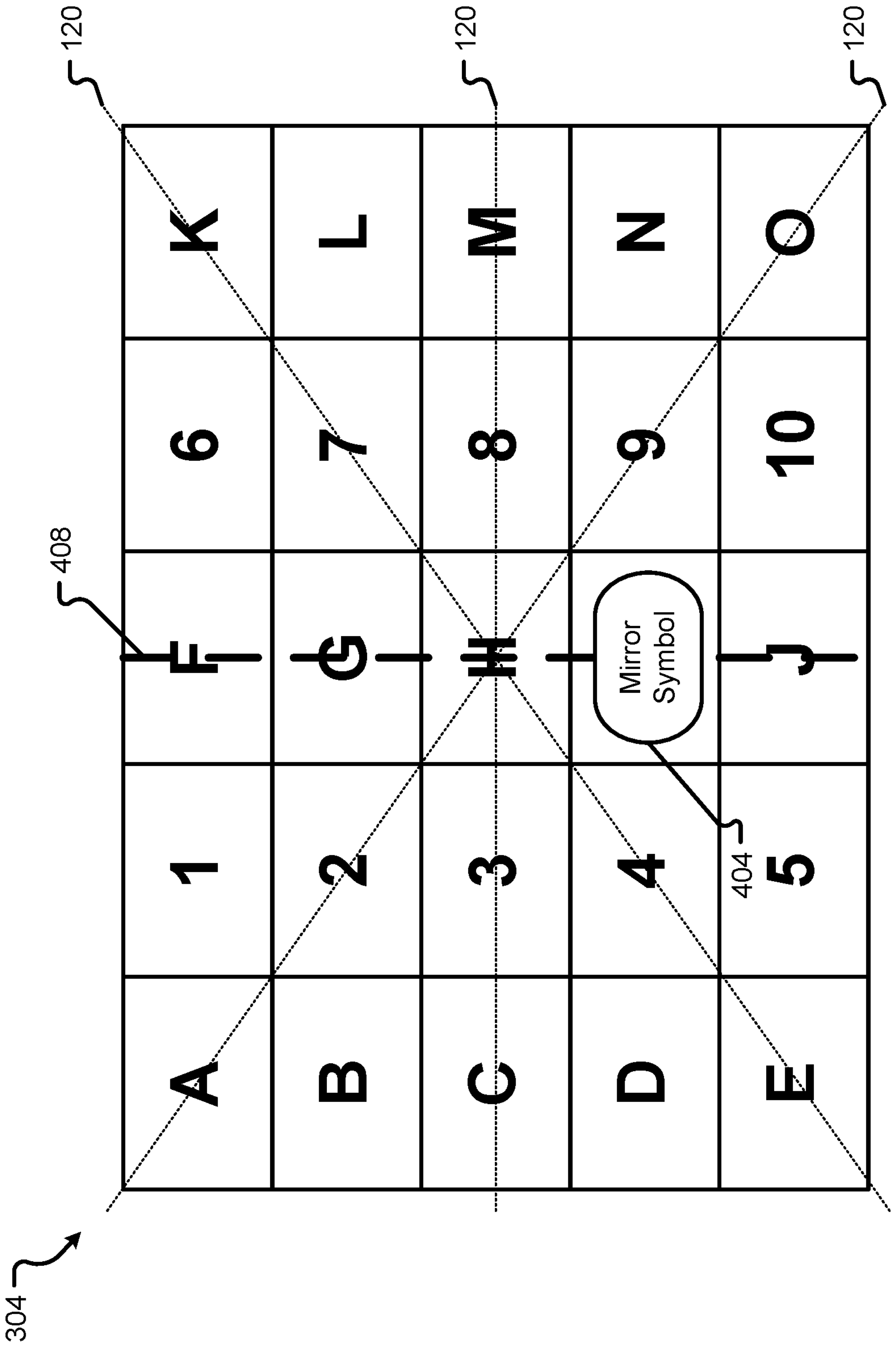
FIG. 10B illustrates a mirror symbol and a first randomly-placed mirror axis within a predetermined symbol area in accordance with embodiments of the present disclosure.
Figure 10C:
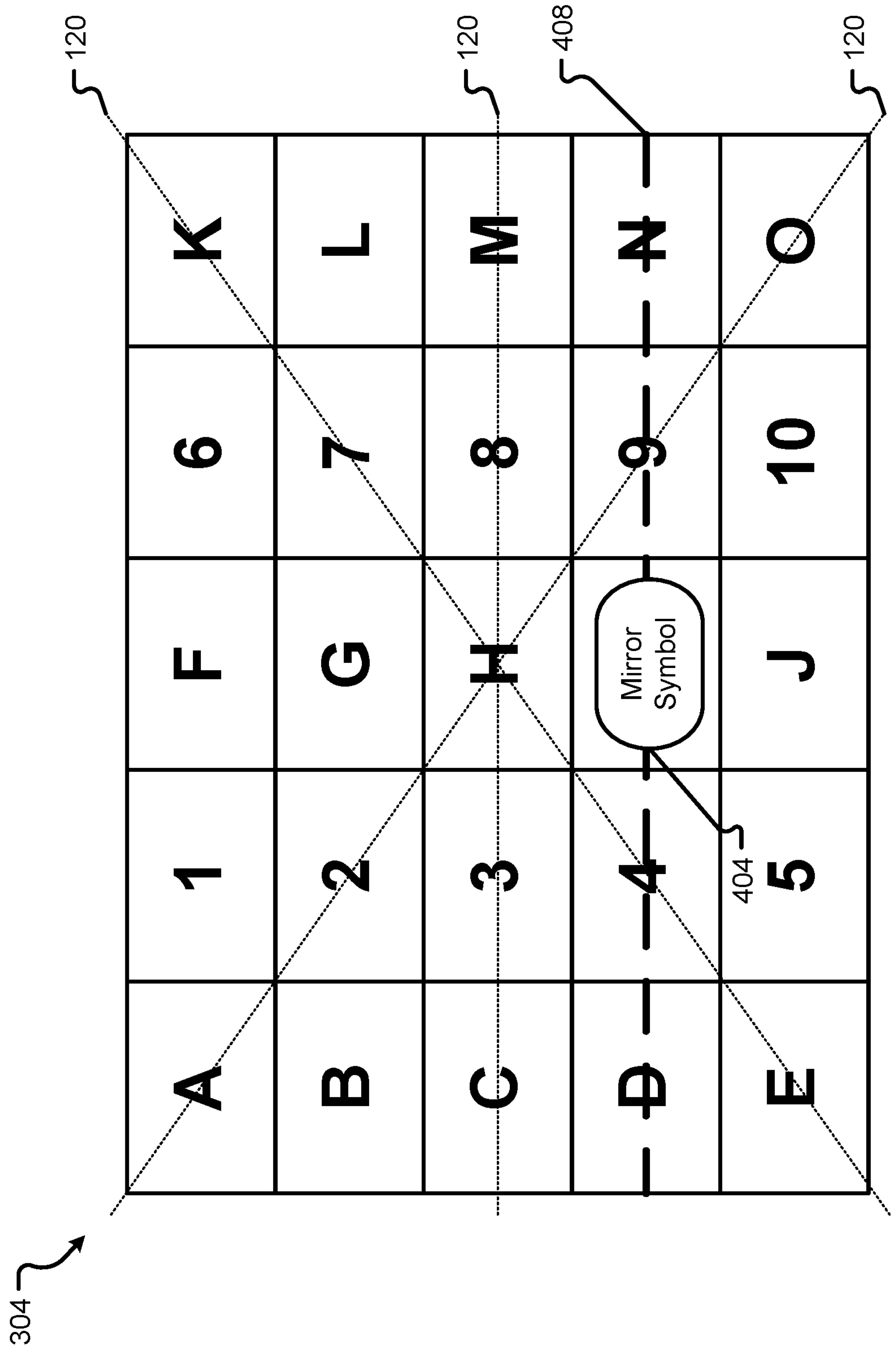
FIG. 10C illustrates a mirror symbol and a second randomly-placed mirror axis within a predetermined symbol area in accordance with embodiments of the present disclosure.

With reference now to FIGS. 10A-10C, additional functionality of the game instruction set 220 and mirroring instruction set 228 will be described in accordance with at least some embodiments of the present disclosure. FIG. 10A illustrates the layout of symbols 316 within the array of symbol areas 304 after a spin event has occurred, but prior to a player making a selection to implement a mirror operation (e.g., invoke a mirror play). In some embodiments, if a mirror symbol 404 lands in a predetermined symbol area 312, the game instruction set 220 may display a prompt window 1004 via the display screen 104. The prompt window 1004 may provide a query for the player that asks whether or not the mirror play is desired.

The player may be allowed to select (through use of buttons 108 or by selection on a touch-sensitive display screen 104) a yes input 1008 or no input 1012. Selecting a yes input 1008 may require the player to also agree to an additional wager or use of playing credits. Upon selecting the yes input 1008, as shown in FIG. 10B or 10C, the game instruction set 220 may call the mirroring instruction set 228. Upon calling the mirroring instruction set 228, the mirroring instruction set 228 may select a position or orientation of the mirror axis 408. In some embodiments, the mirroring instruction set 228 may randomly (e.g., with assistance of the random number generator 232) select an orientation of the mirror axis 408. Alternatively or additionally, the mirroring instruction set 228 may randomly (e.g., with assistance of the random number generator 232) select a symbol area 312 through which the mirror axis 408 will pass. Alternatively or additionally, the mirroring instruction set 228 may randomly (e.g., with assistance of the random number generator 232) select a subset of symbol areas 704 that will be subjected to the mirror operation. As shown in FIG. 10B, the mirror axis 408 may be vertically oriented or, as shown in FIG. 10C, the mirror axis 408 may be horizontally oriented. In some embodiments, the determination or revealing of the mirror axis 408 may only occur after the prompt window 1004 has been presented and the player has selected the yes input 1008.

Figure 11:
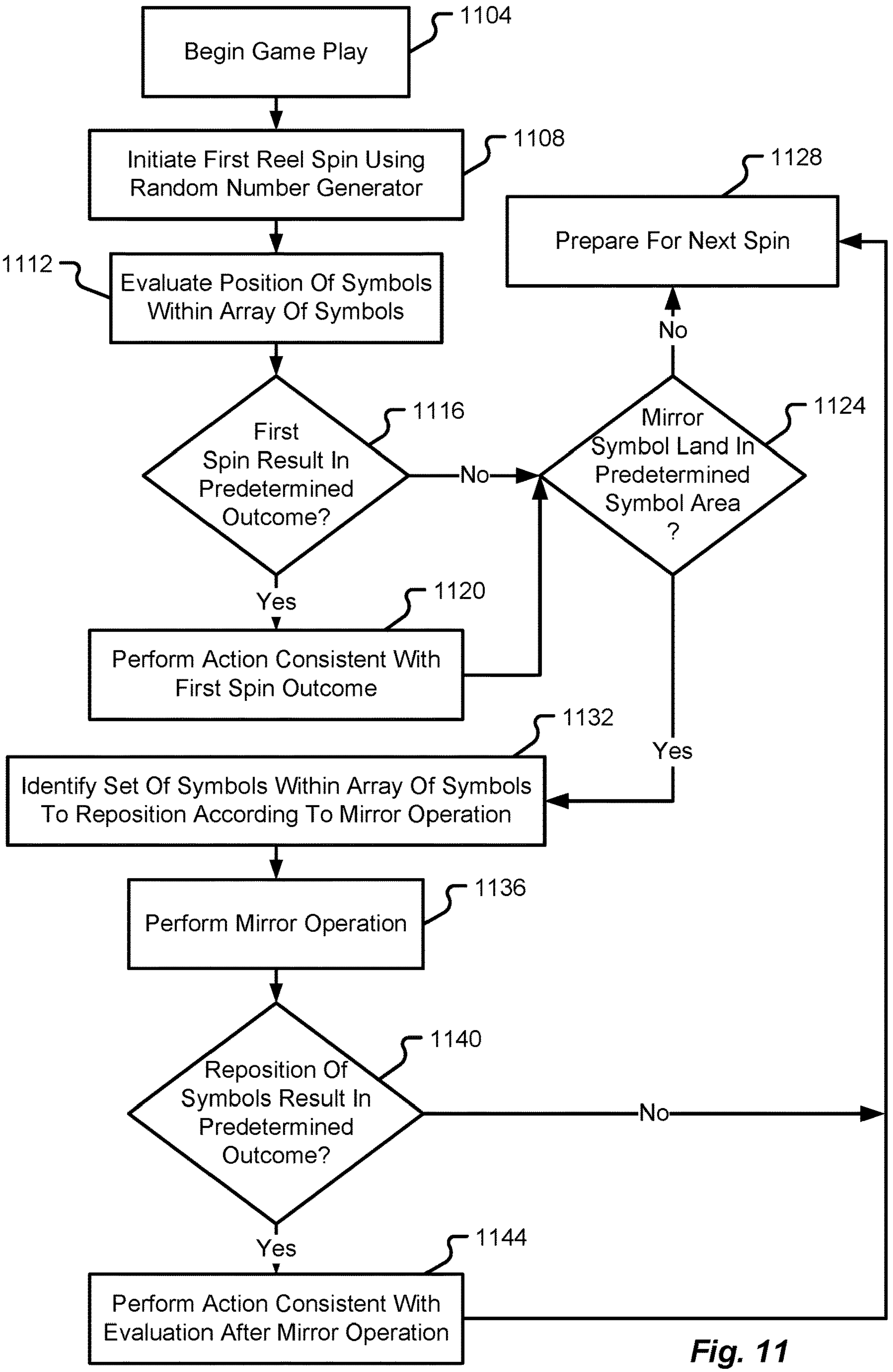
FIG. 11 is a flow chart illustrating a game play method with a mirror operation in accordance with embodiments of the present disclosure.

With reference now to FIG. 11, a game play method with a possibility of a mirror operation will be described in accordance with at least some embodiments of the present disclosure. The method begins when game play is initiated by a player of the computational device 100 (step 1104). This step may occur in response to the player selected a predetermined button 108, inserting coins, cash, tickets, vouchers, etc., or performing some other action at the computational device 100 that indicates a desire to begin game play.

The method may continue by the game instruction set 220 initiating a first reel spin using the random number generator 232 (step 1108). After the first reel spin is completed, the game instruction set 220 may evaluate symbols 316 laid out in the array of symbols 304 (step 112). The evaluation of symbols 316 may include determining which pay lines 120 will be subject to evaluation and whether any of the selected pay lines 120 have a predetermined combination of symbols 316 provided thereon. Eventually, the game instruction set 220 will evaluate the symbols 316 that land on a selected pay line 120 or a plurality of selected pay lines 120 to determine if the first spin resulted in a predetermined game outcome (step 1116). The predetermined game outcome may include winning a prize, winning playing credit, winning money, winning a bonus spin, achieving a game achievement, etc.

Thereafter, the game instruction set 220 will cause the computational device 100 to perform an action consistent with the first spin outcome (step 1120), if the first spin resulted in a predetermined game outcome. The game instruction set 220 will also determine whether a mirror symbol 404 has landed in a predetermined symbol area 312 (step 1124). The order of operations, evaluation, and analysis may be important as part of maintaining a primary pay table and odds that conform with gaming regulations. If the analysis for a mirror symbol 404 occurs prior to the evaluation of the first spin results, then the game odds may change or other system requirements may need to be considered.

If the query of step 1124 is answered negatively, then the game play ends and the computational device 100 prepares for the next spin (step 1128). If the query of step 1124 is answered positively, then the method continues with the game instruction set 220 calling the mirroring instruction set 228 to identify a set of symbols within the array of symbol areas 304 that will be subjected to (e.g., repositioned in accordance with) a mirror operation (step 1132). In some embodiments, the identifying of the set of symbols to subject to the mirror operation may include identifying a position and orientation of a mirror axis 408.

Thereafter, the mirroring instruction set 228 will perform the mirror operation (step 1136). Any of the various mirror operations (or combinations thereof) depicted and described in FIGS. 3-10C may be performed in this step. Thereafter, the game instruction set 220 evaluates the repositioning of the symbols 316 with respect to one or more selected pay lines 120 to determine if the repositioning of symbols 316 has resulted in another (and perhaps different) predetermined outcome (step 1140). If this query is answered negatively, then the method proceeds to step 1128. If this query is answered positively, then the method proceeds with the game instruction set 220 enabling the computational device 100 to perform an action consistent with the evaluation of symbols 316 after the mirror operation (step 1144). Thereafter, the method proceeds to step 1128.

Figure 12:
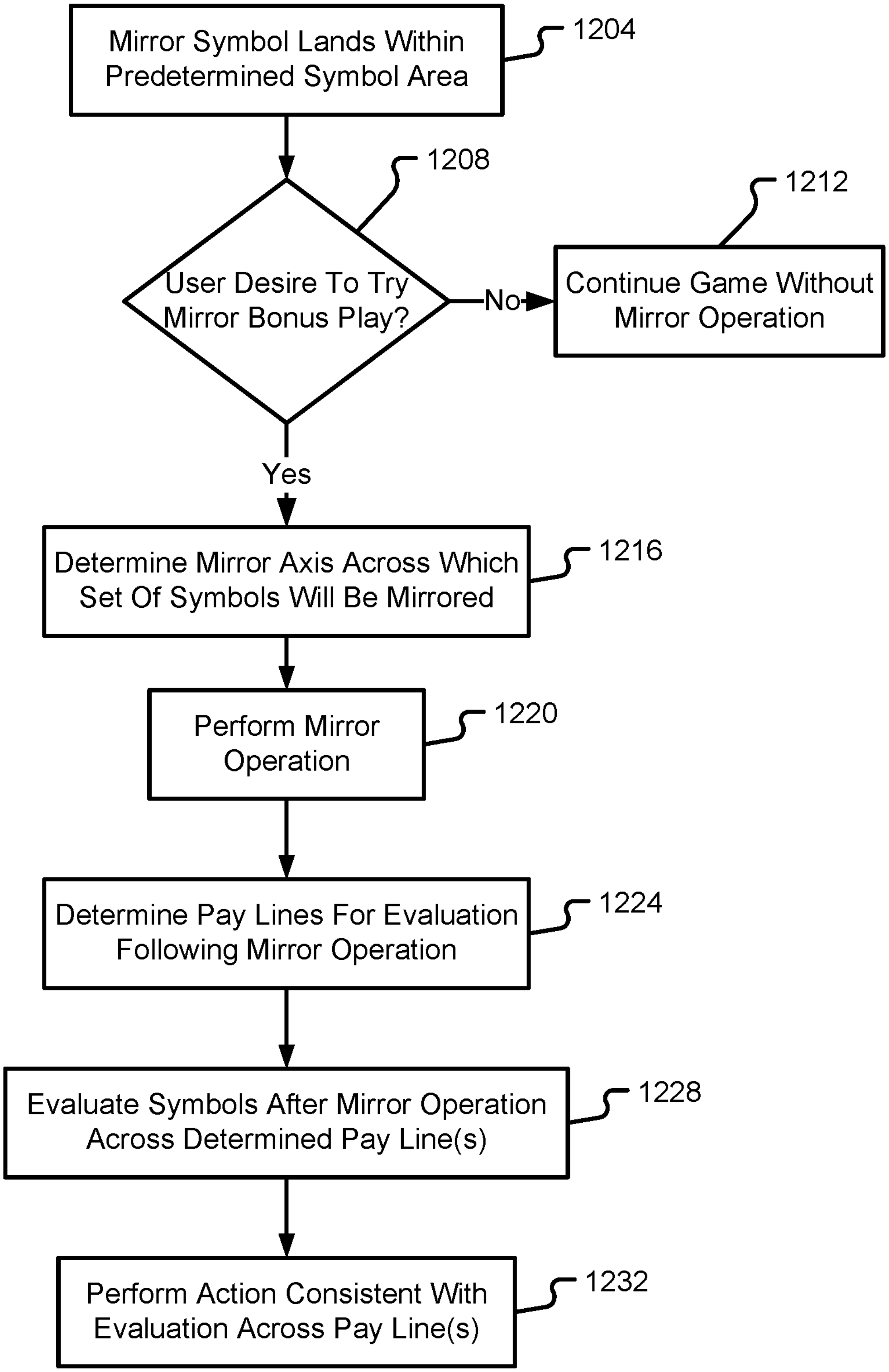
FIG. 12 is a flow chart illustrating details of a mirror operation in accordance with embodiments of the present disclosure.

With reference now to FIG. 12, additional details of a mirror operation will be described in accordance with embodiments of the present disclosure. The method begins when a mirror symbol 404 lands within a predetermined symbol area 312 (step 1204). The method continues by determining whether or not the player/user desires to try or engage in the mirror bonus play (step 1208). This query may be answered by presenting the player with a popup window 1004 asking whether or not the player desires to try the mirror operation. If the query is answered negatively, then the game may continue without the mirror operation (step 1212). Following the query and affirmative answer to the query of step 1208, the method continues with the game instruction set 220 calling the mirroring instruction set 228, which determines a position and orientation of the mirror axis 408 across which a selected set of symbols will be mirrored (step 1216).

The mirroring instruction set 228 may then perform the mirror operation consistent with the position and orientation of the mirror axis 408 (step 1220). The game instruction set 220 may then determine which pay lines 120 will be evaluated following the mirror operation (step 1224). It should be appreciated that this determination may be made prior to the position and orientation of the mirror axis 408 being displayed to the player.

After the mirror operation, the game instruction set 220 may evaluate the symbols 316 across the determined pay lines 120 (step 1128) and cause the computational device 100 to perform any actions consistent with the results of the pay line 120 evaluation (step 1232). It should be appreciated that if the predetermined outcome results in another mirror symbol 404 landing in another predetermined area 312, then the method of FIG. 12 may be repeated with a different mirror axis 408 or differently-oriented mirror axis 408.

Figure 13:
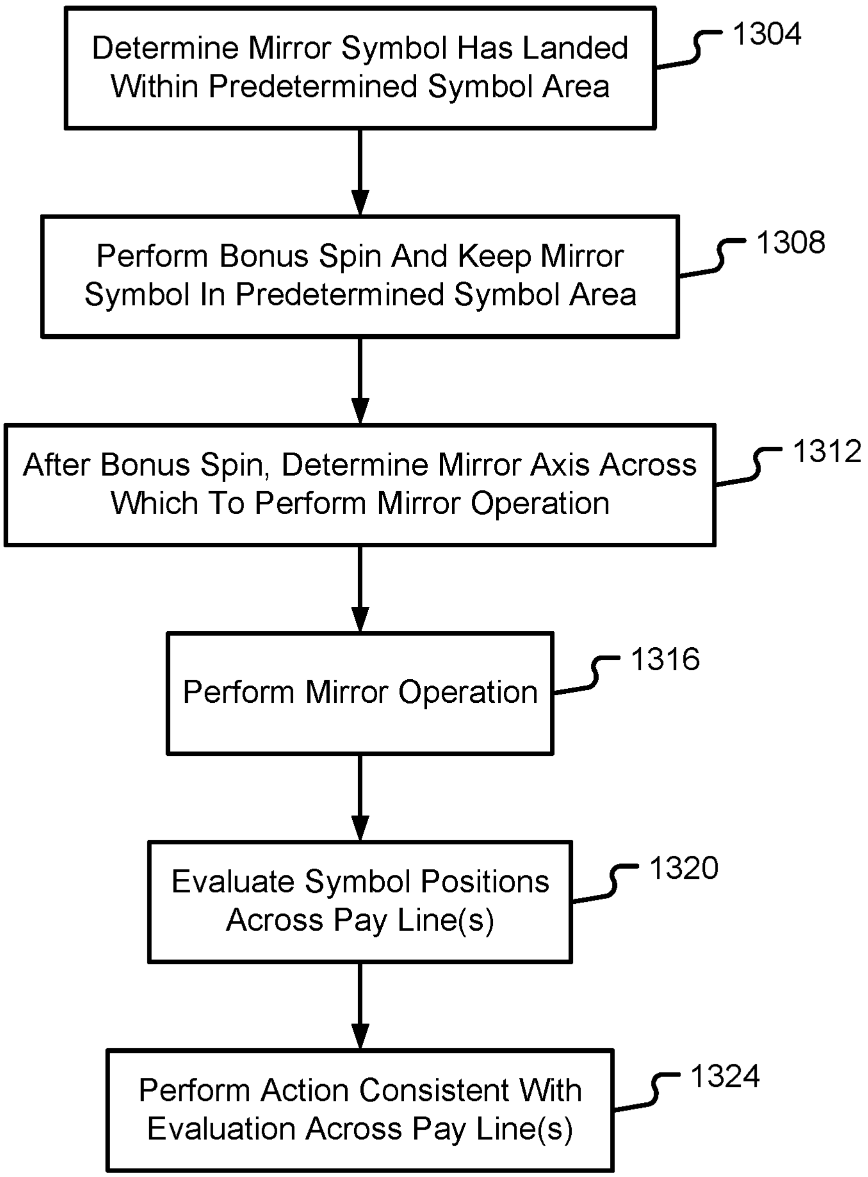
FIG. 13 is a flow chart illustrating bonus spin method in accordance with embodiments of the present disclosure.

With reference now to FIG. 13, additional details of a bonus spin method will be described in accordance with embodiments of the present disclosure. The method begins with the game instruction set 220 determining that a mirror symbol 404 has landed in a predetermined symbol area 312 (step 1304). Thereafter, the method continues with the game instruction set 220 enabling a bonus spin of the reels, while keeping the mirror symbol 404 in the predetermined symbol area 312 (step 1308).

After the bonus spin, the mirroring instruction set 228 may be used to determine a position and orientation of a mirror axis 408 across which to perform a mirror operation (step 1312). In some embodiments, the mirror axis 408 may pass through the predetermined symbol area 312, but such a positioning of the mirror axis 408 is not required. Once the mirror axis 408 has its position and orientation selected, the method continues with the mirroring instruction set 228 performing the mirror operation (step 1316). The game instruction set 220 may then evaluate symbol 316 positions with respect to selected pay line(s) 120 (step 1320). The evaluation of the symbols 316 relative to the pay line(s) 120 may result in the game instruction set 220 determining that one or more predetermined outcomes should be performed. In response, the method continues with the game instruction set 220 causing the computational device 100 to perform one or more actions consistent with the evaluation after the mirror operation (step 1324).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A computational device, comprising:

a user interface comprising a user input and user output;

a processor coupled with the user interface; and a computer-readable storage medium, coupled with the processor, comprising instructions that are executable by the processor, wherein the instructions comprise instructions that:

instruct the user interface to render, after a reel spin, a game output in which a position of symbols rendered via the user interface within an array of symbol areas comprise a predetermined symbol having landed within a predetermined symbol area; and instruct the user interface to automatically re-render the symbols such that after the symbols have been re-rendered, the predetermined symbol having landed in the predetermined symbol area remains in the predetermined symbol area, and at least some other symbols rendered in the game output are mirrored across an axis that bisects the predetermined symbol area.

2. The computational device of claim 1, wherein symbols falling on the axis that bisects the predetermined symbol area are not moved after the symbols have been re-rendered.

3. The computational device of claim 2, wherein the re-rendering is performed after the reel spin.

4. The computational device of claim 2, wherein the instructions further comprise instructions that:

receive an output from a random number generator;

automatically initiate an additional reel spin; and instruct the user interface to automatically re-render the array of symbol areas with the symbols positioned according to the additional reel spin.

5. The computational device of claim 4, wherein the symbols within the array of symbol areas satisfy an outcome justifying a game play event and wherein the outcome justifying the game play event comprises a bonus spin.

6. The computational device of claim 5, wherein the instructions further comprise instructions that, after the symbols have been re-rendered, automatically initiate an additional spin that causes new symbols to be presented within the array of symbol areas.

7. The computational device of claim 1, wherein an orientation of the axis depends upon an output of a random number generator.

8. The computational device of claim 7, wherein the axis comprises a vertical orientation.

9. The computational device of claim 7, wherein the axis comprises a horizontal orientation.

10. The computational device of claim 7, wherein the axis comprises a diagonal orientation.

11. The computational device of claim 7, wherein the axis bisects the array of symbol areas.

12. The computational device of claim 7, wherein symbols overlapped by the axis are left unmoved during the re-rendering.

13. A system, comprising:

a processor;

a computer-readable storage medium, coupled with the processor, comprising instructions that are executable by the processor, wherein the instructions comprise instructions that:

instruct a user interface to render, after a reel spin, a game output in which a position of symbols within an array of symbol areas comprise a predetermined symbol having landed within a predetermined symbol area; and instruct the user interface to re-render the array of symbol areas with the symbols such that after the symbols have been re-rendered, the predetermined symbol having landed in the predetermined symbol area remains in the predetermined symbol area, and at least some other symbols rendered in the game output are mirrored across an axis that bisects the predetermined symbol area.

14. The system of claim 13, wherein the symbols falling on the axis that bisects the predetermined symbol area are not moved after the symbols have been re-rendered.

15. The system of claim 14, wherein the instructions further comprise instructions that:

receive an output from a random number generator;

automatically initiate an additional reel spin; and instruct the user interface to automatically re-render the array of symbol areas with the symbols positioned according to the additional reel spin.

16. The system of claim 13, wherein an orientation of the axis depends upon an output of a random number generator.

17. The system of claim 16, wherein the axis bisects the array of symbol areas and comprises at least one of a vertical orientation, a horizontal orientation, and a diagonal orientation.

18. The system of claim 17, wherein symbols overlapped by the axis are left unmoved during the re-rendering.

19. The system of claim 13, further comprising instructions that:

prompt a user as to whether or not the re-rendering is to be executed;

receive a user input indicating that the user desires to execute the re-rendering; and in response to receiving the user input, instruct the user interface to re-rendering the array of symbols.

20. A method, comprising:

initiating, with a processor and in response to receiving a user input, a reel spin;

causing an array of symbol areas to be rendered via a user interface with symbols positioned therein according to a determined position of the symbols at an end of the reel spin, wherein the symbols positioned in the array of symbol areas include a predetermined symbol having landed within a predetermined symbol area;

automatically causing the array of symbol areas to be re-rendered via the user interface such that after the symbols have been re-rendered, the predetermined symbol having landed within the predetermined symbol area remains in the predetermined symbol area, and at least some other symbols rendered at the end of the reel spin are mirrored across an axis that bisects the predetermined symbol area; and automatically performing, with the processor, a bonus spin.

* * * * *